US008104729B2

(12) United States Patent
Walke et al.

(10) Patent No.: US 8,104,729 B2

(45) Date of Patent: Jan. 31, 2012

(54) TRANSFERABLE PATIENT CARE EQUIPMENT SUPPORT

(75) Inventors: James L. Walke, Batesville, IN (US); David C. Newkirk, Lawrenceburg, IN (US); Douglas A. Seim, Okeana, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 784 days.

(21) Appl. No.: 11/684,340

(22) Filed: Mar. 9, 2007

(65) Prior Publication Data

US 2008/0217910 A1 Sep. 11, 2008

(51) Int. Cl.

| | |
|---|---|
| ***F16M 13/00*** | (2006.01) |
| ***A01K 97/10*** | (2006.01) |
| ***A45B 25/28*** | (2006.01) |
| ***A47G 25/12*** | (2006.01) |
| ***A47G 33/12*** | (2006.01) |
| ***F16C 11/00*** | (2006.01) |

(52) U.S. Cl. ................ 248/288.31; 248/125.1; 248/580; 248/511; 248/512; 248/516; 248/535; 248/536; 285/121.7; 5/503.1; 403/131

(58) Field of Classification Search ............. 248/288.31, 248/125.1, 125.8, 284.1, 333, 580, 125, 317, 248/511, 512, 514, 516, 535, 536; 285/121.7; 5/503.1, 568, 611, 613, 616; 403/131
See application file for complete search history.

(56) References Cited

U.S. PATENT DOCUMENTS

| | | | |
|---|---|---|---|
| 383,815 | A | 5/1888 | Kilborn |
| 1,290,809 | A | 1/1919 | Truax |
| 1,490,650 | A | 4/1924 | Wagner |
| 1,919,114 | A | 7/1933 | Ley |
| 2,470,524 | A | 5/1949 | Scudder |
| 2,497,425 | A | 2/1950 | Terry |
| 2,673,771 | A | 3/1954 | Krewson |
| 2,696,963 | A | 12/1954 | Sheperd |
| 3,004,743 | A | 10/1961 | Wenger |
| 3,213,877 | A | 10/1965 | May et al. |

(Continued)

FOREIGN PATENT DOCUMENTS

| | | |
|---|---|---|
| DE | 92 04 321.6 | 5/1992 |

(Continued)

OTHER PUBLICATIONS

"Pump Star User's Manual", The Headwall Company, Modular Service Company, Dec. 22, 2005, 11 pages.

(Continued)

*Primary Examiner* — Terrell McKinnon
*Assistant Examiner* — Christopher Garft
(74) *Attorney, Agent, or Firm* — Barnes & Thornburg LLP

(57) ABSTRACT

A patient care equipment support is transferable between a first device having a first spherical socket and a second device having a second spherical socket. The equipment support comprises an equipment supporting portion configured to support patient care equipment and a coupler extending downwardly from the equipment supporting portion. The coupler has first and second spherical portions configured for receipt in the first and second spherical sockets, respectively. The first and second spherical portions are rotatable within the respective first and second spherical sockets about a multitude of axes to compensate for misalignment between the coupler and at least one of the first and second spherical sockets during transfer of the equipment support between the first and second devices.

9 Claims, 16 Drawing Sheets

U.S. PATENT DOCUMENTS

| | | | | |
|---|---|---|---|---|
| 3,395,281 | A | | 7/1968 | Roen et al. |
| 3,431,937 | A | | 3/1969 | Hettlinger et al. |
| 3,552,577 | A | | 1/1971 | Latham, Jr. |
| 3,674,294 | A | | 7/1972 | Kirkham |
| 3,709,556 | A | | 1/1973 | Allard et al. |
| 3,814,023 | A | | 6/1974 | Stantial |
| 4,005,844 | A | | 2/1977 | Richmond |
| 4,094,484 | A | | 6/1978 | Galione |
| 4,113,222 | A | | 9/1978 | Frinzel |
| 4,190,224 | A | | 2/1980 | LeBlanc et al. |
| 4,225,104 | A | | 9/1980 | Larson |
| 4,262,874 | A | | 4/1981 | Seigh |
| D260,916 | S | | 9/1981 | Zissimopoulos et al. |
| 4,339,104 | A | | 7/1982 | Weidman |
| 4,378,014 | A | | 3/1983 | Elkow |
| 4,489,454 | A | | 12/1984 | Thompson |
| 4,511,157 | A | | 4/1985 | Wilt, Jr. |
| 4,511,158 | A | | 4/1985 | Varga et al. |
| 4,559,036 | A | | 12/1985 | Wunsch |
| 4,600,209 | A | | 7/1986 | Kerr, Jr. |
| 4,616,797 | A | | 10/1986 | Cramer |
| D289,604 | S | | 5/1987 | Gallant et al. |
| 4,666,450 | A | * | 5/1987 | Kenna ........................ 623/22.28 |
| 4,691,397 | A | | 9/1987 | Netzer |
| 4,718,892 | A | | 1/1988 | Yung-Ho |
| 4,725,027 | A | * | 2/1988 | Bekanich ................... 248/125.8 |
| 4,729,576 | A | | 3/1988 | Roach |
| 4,738,369 | A | | 4/1988 | Desjardins |
| 4,744,536 | A | | 5/1988 | Bancalari |
| 4,756,706 | A | | 7/1988 | Kerns et al. |
| 4,795,122 | A | | 1/1989 | Petre |
| 4,879,798 | A | * | 11/1989 | Petre ............................... 29/434 |
| 4,888,922 | A | * | 12/1989 | Lancelot ...................... 52/124.2 |
| 4,892,279 | A | | 1/1990 | Lafferty et al. |
| 4,901,967 | A | | 2/1990 | Petre |
| 4,905,882 | A | | 3/1990 | Ross |
| 4,905,944 | A | | 3/1990 | Jost et al. |
| 4,925,444 | A | | 5/1990 | Orkin et al. |
| 4,945,592 | A | | 8/1990 | Sims et al. |
| 4,966,340 | A | | 10/1990 | Hunter |
| 4,969,768 | A | | 11/1990 | Young |
| 4,997,150 | A | | 3/1991 | Mardollo |
| 5,016,307 | A | | 5/1991 | Rebar |
| 5,078,349 | A | * | 1/1992 | Smith ........................ 248/125.8 |
| 5,083,807 | A | | 1/1992 | Bobb et al. |
| 5,094,418 | A | | 3/1992 | McBarnes, Jr. et al. |
| 5,110,076 | A | | 5/1992 | Snyder et al. |
| 5,112,019 | A | | 5/1992 | Metzler et al. |
| 5,125,607 | A | | 6/1992 | Pryor |
| 5,135,191 | A | * | 8/1992 | Schmuhl .................... 248/125.1 |
| 5,149,036 | A | | 9/1992 | Sheehan |
| 5,207,642 | A | | 5/1993 | Orkin et al. |
| 5,219,139 | A | | 6/1993 | Hertzler et al. |
| 5,224,681 | A | | 7/1993 | Lundstrom |
| 5,306,109 | A | | 4/1994 | Kreuzer et al. |
| 5,319,816 | A | | 6/1994 | Ruehl |
| 5,326,059 | A | | 7/1994 | Pryor et al. |
| 5,337,992 | A | | 8/1994 | Pryor et al. |
| 5,344,169 | A | | 9/1994 | Pryor et al. |
| 5,366,191 | A | | 11/1994 | Bekanich |
| 5,400,995 | A | | 3/1995 | Boyd |
| 5,407,163 | A | | 4/1995 | Kramer et al. |
| 5,421,548 | A | | 6/1995 | Bennett et al. |
| 5,527,125 | A | | 6/1996 | Kreuzer et al. |
| 5,556,065 | A | | 9/1996 | Wadley |
| 5,588,166 | A | | 12/1996 | Burnett |
| 5,618,090 | A | | 4/1997 | Montague et al. |
| 5,636,823 | A | | 6/1997 | Boyd |
| 5,647,491 | A | | 7/1997 | Foster et al. |
| 5,657,884 | A | | 8/1997 | Zilincar, III |
| 5,664,750 | A | * | 9/1997 | Cohen ...................... 248/231.71 |
| 5,699,988 | A | | 12/1997 | Boettger et al. |
| 5,704,577 | A | | 1/1998 | Gordon |
| 5,857,685 | A | | 1/1999 | Phillips et al. |
| 5,876,016 | A | | 3/1999 | Urban et al. |
| 5,878,536 | A | | 3/1999 | Demmitt et al. |
| 5,898,961 | A | | 5/1999 | Ambach et al. |
| 5,924,658 | A | | 7/1999 | Shiery et al. |
| 5,966,760 | A | | 10/1999 | Gallant et al. |
| 5,987,670 | A | | 11/1999 | Sims et al. |
| 6,056,249 | A | | 5/2000 | Fillon, Jr. |
| 6,073,285 | A | | 6/2000 | Ambach et al. |
| 6,109,572 | A | | 8/2000 | Urban et al. |
| 6,155,743 | A | | 12/2000 | Chen |
| 6,170,102 | B1 | | 1/2001 | Kreuzer |
| 6,179,260 | B1 | | 1/2001 | Ohanian |
| 6,182,662 | B1 | | 2/2001 | McGhee |
| 6,213,481 | B1 | | 4/2001 | Marchese et al. |
| 6,231,016 | B1 | | 5/2001 | Slone |
| 6,375,133 | B1 | | 4/2002 | Morrow |
| 6,390,311 | B1 | | 5/2002 | Belokin |
| 6,434,329 | B1 | | 8/2002 | Dube et al. |
| 6,601,860 | B2 | | 8/2003 | Potter |
| 6,619,599 | B2 | | 9/2003 | Elliott et al. |
| 6,708,991 | B1 | | 3/2004 | Ortlieb |
| 6,725,483 | B2 | | 4/2004 | Gallant et al. |
| 7,065,812 | B2 | * | 6/2006 | Newkirk et al. .................. 5/600 |
| 7,150,058 | B2 | * | 12/2006 | Rabska et al. .................... 5/662 |
| 2002/0047075 | A1 | | 4/2002 | Metz et al. |
| 2002/0104934 | A1 | | 8/2002 | Elliott et al. |
| 2003/0014817 | A1 | | 1/2003 | Gallant et al. |
| 2003/0037375 | A1 | * | 2/2003 | Riley et al. ........................ 5/600 |
| 2004/0199999 | A1 | | 10/2004 | Newkirk et al. |
| 2005/0000019 | A1 | * | 1/2005 | Newkirk et al. .................. 5/600 |
| 2006/0207026 | A1 | | 9/2006 | Newkirk et al. |
| 2006/0242763 | A1 | * | 11/2006 | Graham et al. ................ 5/503.1 |
| 2008/0073477 | A1 | * | 3/2008 | Lang et al. .................... 248/476 |

FOREIGN PATENT DOCUMENTS

| | | | |
|---|---|---|---|
| DE | 92 04 3216 | U1 | 7/1992 |
| EP | 0 943 306 | B1 | 9/1999 |
| EP | 1 243 900 | A2 | 9/2002 |
| GB | 1 061 383 | | 3/1967 |
| WO | 00/09061 | | 2/2000 |

OTHER PUBLICATIONS

"Modular Pump Star", The Headwall Company, Modular Services Company, 2005, 4 pages.
Search reported dated Apr. 8, 2008 from PCT/US07/63778.

* cited by examiner

TRANSFERABLE PATIENT CARE EQUIPMENT SUPPORT

FIELD OF THE INVENTION

The present disclosure relates to a patient care equipment support, and more particularly relates to a transferable patient care equipment support.

BACKGROUND OF THE INVENTION

Hospitalized patients often require patient care equipment to be in close proximity during hospital care. Such patient care equipment is typically supported on a patient care equipment support such as, a rack, shelf system, cabinet, or the like. Examples of patient care equipment includes, but are not limited to, the following: heart monitoring equipment, medical gas delivery equipment, infusion management equipment, intra-venous bags, equipment monitors, patient monitors, defibrillators, IV poles, and the like, many of which directly connect to the patient via lines or tubes.

It is desirable that patient care equipment is transferable between a patient support, such as a hospital bed, a stretcher, an ambulatory care chair, and the like, and a support structure, such as a ceiling or wall-mounted service column, a ceiling or wall-mounted equipment support arm, a floor-supported stand, a wheeled cart, a headwall, a wall of a hospital room, and the like. An illustrative patient care equipment support that is transferable between a patient support, such as a hospital bed, and a support structure, such as a service column, is disclosed in a U.S. Patent Application, Publication Number US-2006-0242763-A1, which application is hereby incorporated by reference herein.

SUMMARY OF THE INVENTION

The present invention comprises an apparatus or a method having one or more of the features recited in the claims or one or more of the following features, which alone or in any combination may comprise patentable subject matter:

A patient care equipment support may be transferable between a first device having a first generally spherical socket and a second device having a generally second spherical socket. The equipment support may comprise an equipment supporting portion configured to support patient care equipment, and a coupler extending downwardly from the equipment supporting portion. The coupler may have first and second generally spherical portions configured for receipt in the first and second spherical sockets, respectively. The first and second spherical portions may be rotatable within the respective first and second spherical sockets about a multitude of axes to compensate for misalignment between the coupler and at least one of the first and second spherical sockets during transfer of the equipment support between the first and second devices.

The coupler may comprise a post that extends downwardly from the equipment supporting portion. The first and second spherical portions may be coupled to the post, with the second spherical portion coupled to the post below the first spherical portion. The coupler may further comprise first and second generally cylindrical portions that project downwardly from the respective first and second spherical portions and that have a diameter greater than a diameter of the post.

The post may have a first portion that extends above the first spherical portion, a second portion that extends between the first and second spherical portions, and a third portion that extends below the second spherical portion. The post may be tapered at a lower end of the third portion.

In some embodiments, the coupler may comprise first and second posts that extend downwardly from the equipment supporting portion. The first and second spherical portions may be coupled to the first and second posts, respectively. The coupler may further comprise first and second generally cylindrical portions that project downwardly from the respective first and second spherical portions and that have a diameter greater than a diameter of the associated post.

Each post may have first and second portions that respectively extend above and below the associated spherical portion. Each post may be tapered at a lower end of the second portion. A first distance between the first spherical portion and the equipment supporting portion and a second distance between the second spherical portion and the equipment supporting portion may be about equal. The equipment support may comprise one of an IV pole and a rack adapted to carry infusion management equipment.

A patient care equipment support may comprise an equipment supporting portion and a coupler extending downwardly from the equipment supporting portion. The coupler may include a post, a generally spherical portion coupled to the post, and a generally cylindrical portion that projects downwardly from the spherical portion and that has a diameter greater than the diameter of the post.

A socket for use with the equipment support may comprise a body having an upwardly-opening cavity that is configured to receive a first portion of the coupler and a bore that is configured to receive a second portion of the coupler, and a locking member coupled to the body for pivoting movement and having a first region situated in the cavity. The locking member may be configured so that contact of the first region of the locking member by the first portion of the coupler during downward movement of the coupler results in pivoting movement of the locking member so that a second region of the locking member engages the second portion of the coupler.

The locking member may be coupled to the body for pivoting movement about a pivot axis that extends generally perpendicularly to a longitudinal axis of the coupler. The locking member may have a slot and a pivot pin defining the pivot axis of the locking member may extend through the slot. The body may have an upper opening through which the first region of the locking member may move into and out of the cavity. The body may have a lower opening through which the second region of the locking member may move into and out of the bore.

The locking member may be coupled to the body for pivoting movement such that, when the first region of the locking member moves into the cavity through the upper opening, the second region of the locking member moves out of the bore through the lower opening, and such that, when the second region of the locking member moves into the bore through the lower opening, the first region of the locking member moves out of the cavity through the upper opening.

The second region of the locking member that is configured to engage the second portion of the coupler may comprise a tacky surface. In some embodiments, the second region of the locking member that is configured to engage the second portion of the coupler may comprise a rubberized surface. In still other embodiments, the second region of the locking member that is configured to engage the second portion of the coupler may comprise a textured surface. The locking member may comprise first and second locking members disposed on opposite sides of the cavity and the bore.

In some embodiments, a socket for use with the equipment support may have a generally c-shaped cross section with spaced apart end portions that define a laterally outwardly-opening slot in communication with an upwardly-opening cavity in the socket that is configured to receive the enlarged portion of the coupler when the coupler is inserted into the socket through the laterally outwardly-opening cavity. The laterally outwardly-opening slot may have an upper region that progressively decreases in width and a lower region that progressively increases in width.

In other embodiments, a socket for use with the equipment support may comprise upper and lower portions. The upper portion may have an upwardly-opening generally spherical cavity that is configured to receive a spherical portion of the coupler and a bore that is configured to receive a post of the coupler. The lower portion may have an upwardly-opening conical cavity that is configured to guide a lower end of the post into a bore in the lower portion having a diameter that is larger than the diameter of the post.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the following figures, in which.

DETAILED DESCRIPTION OF THE DRAWINGS

Figure 1:
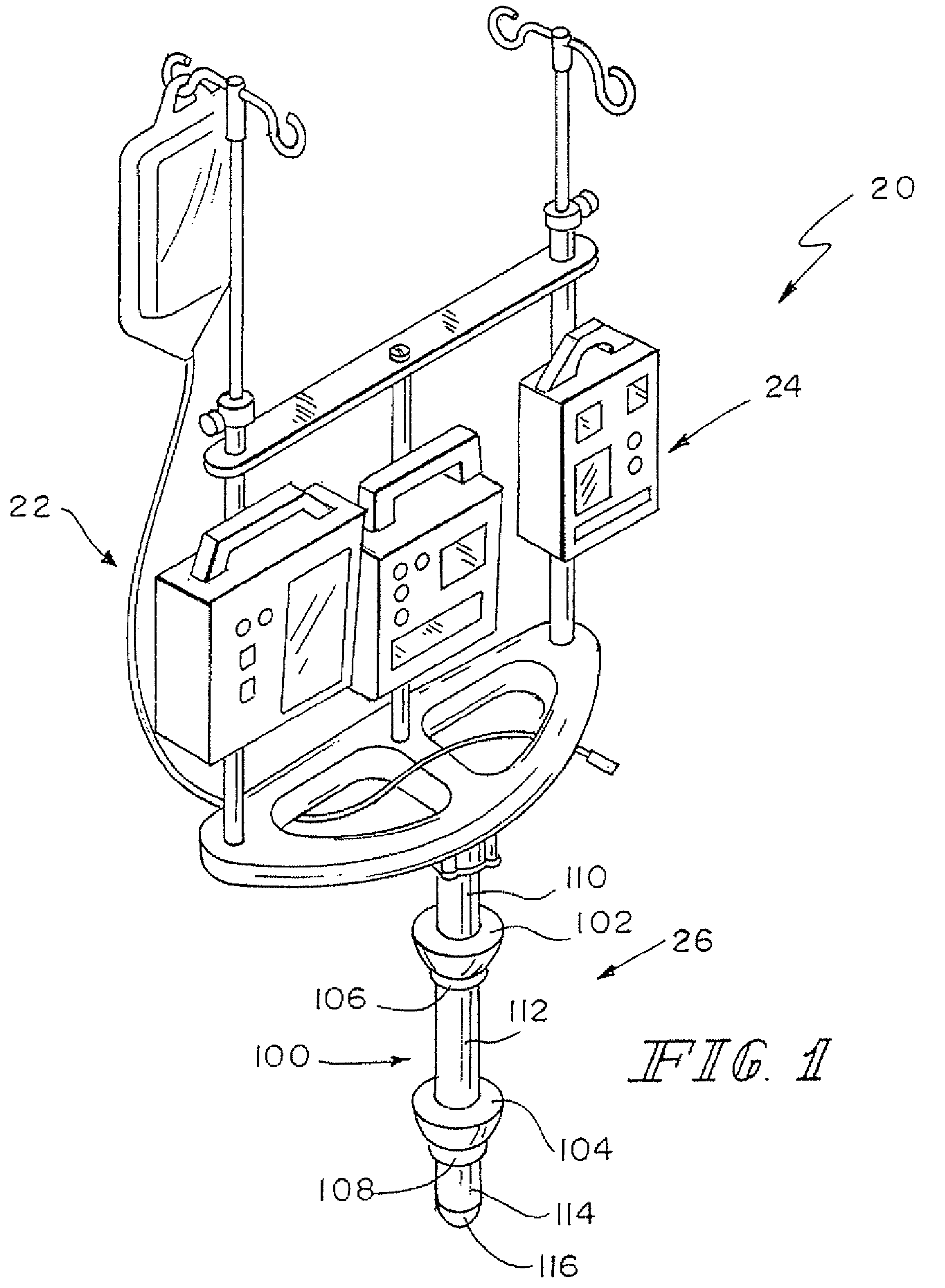
FIG. 1 is a perspective view of a transferable patient care equipment support including an upper equipment supporting portion, a post extending downwardly from the equipment supporting portion, upper and lower generally spherical portions coupled to the post, and upper and lower generally cylindrical portions projecting downwardly from the respective upper and lower spherical portions.
Figure 2:
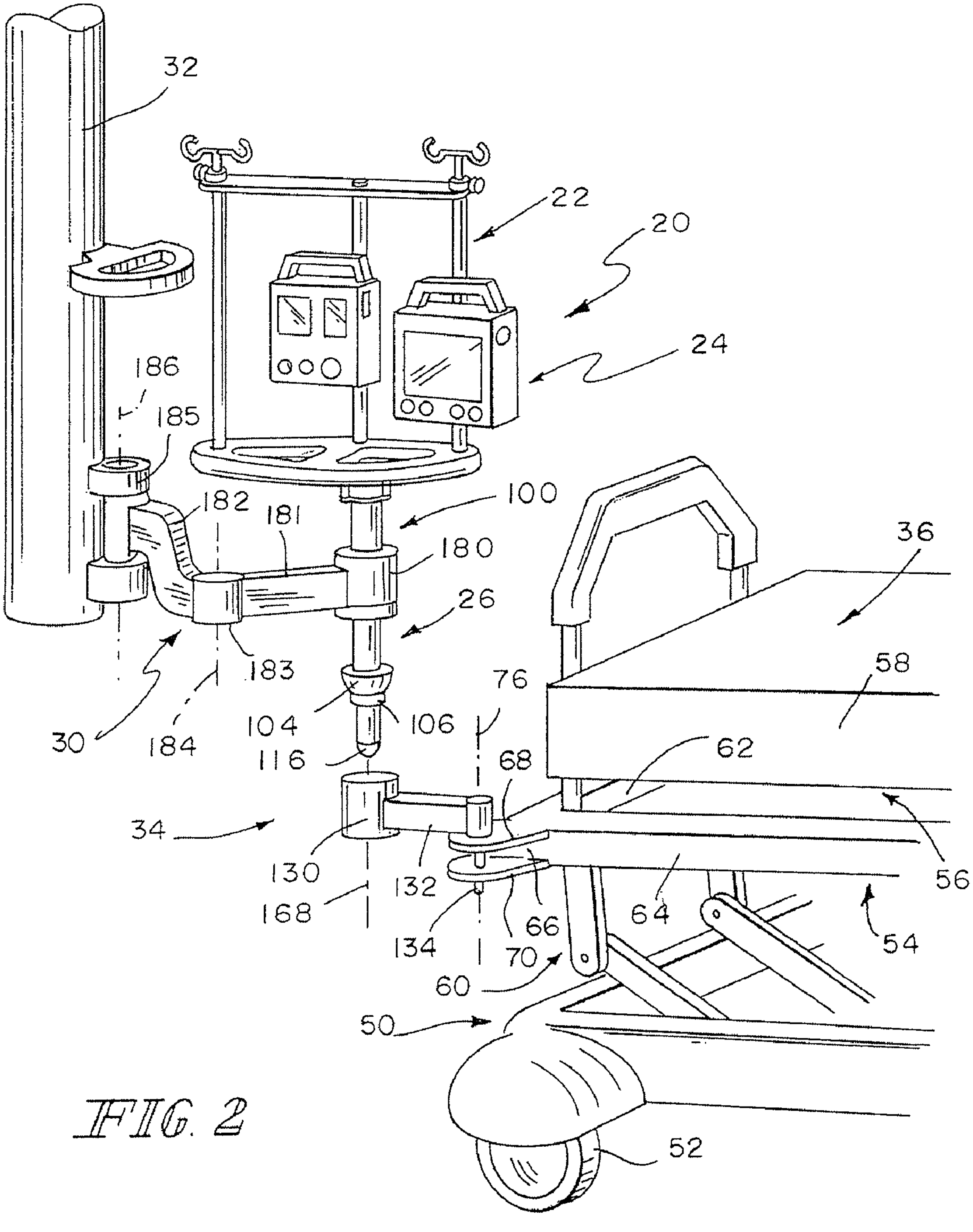
FIG. 2 is a perspective view showing the equipment support being transferred from a service column having an upper generally spherical socket to a hospital bed having a lower generally spherical socket.

FIG. 1 shows an equipment support 20 having an equipment supporting portion 22 configured to support patient care equipment 24 and a coupler 26 coupled to equipment supporting portion 22 and extending downwardly therefrom. FIG. 2 shows the equipment support 20 being transferred from an upper spherical socket assembly 30 carried by a support structure, such as a service column 32, to a lower spherical socket assembly 34 carried by a patient support, such as a hospital bed 36. In FIG. 2, the support structure is illustratively the service column 32 carried by a radial arm (not shown) mounted to a ceiling or a wall of a patient room 38 of a hospital or a healthcare facility. However, it should be understood that the support structure may very well be a wheeled cart or dolly 220 (FIG. 13), a floor-supported stand 250 (FIG. 14), a headwall, a wall of a hospital room, and the like. Also, in FIG. 2, the patient support is illustratively the hospital bed 36 positioned in the patient room 38. However, it should be understood that the patient support may very well be a stretcher, a surgical table, an ambulatory care chair, and the like. Also, it should be understood that the support structure and the patient support may be used in different settings such as, for example, intensive care rooms, operating rooms, nursing homes and physician offices.

Figure 7:
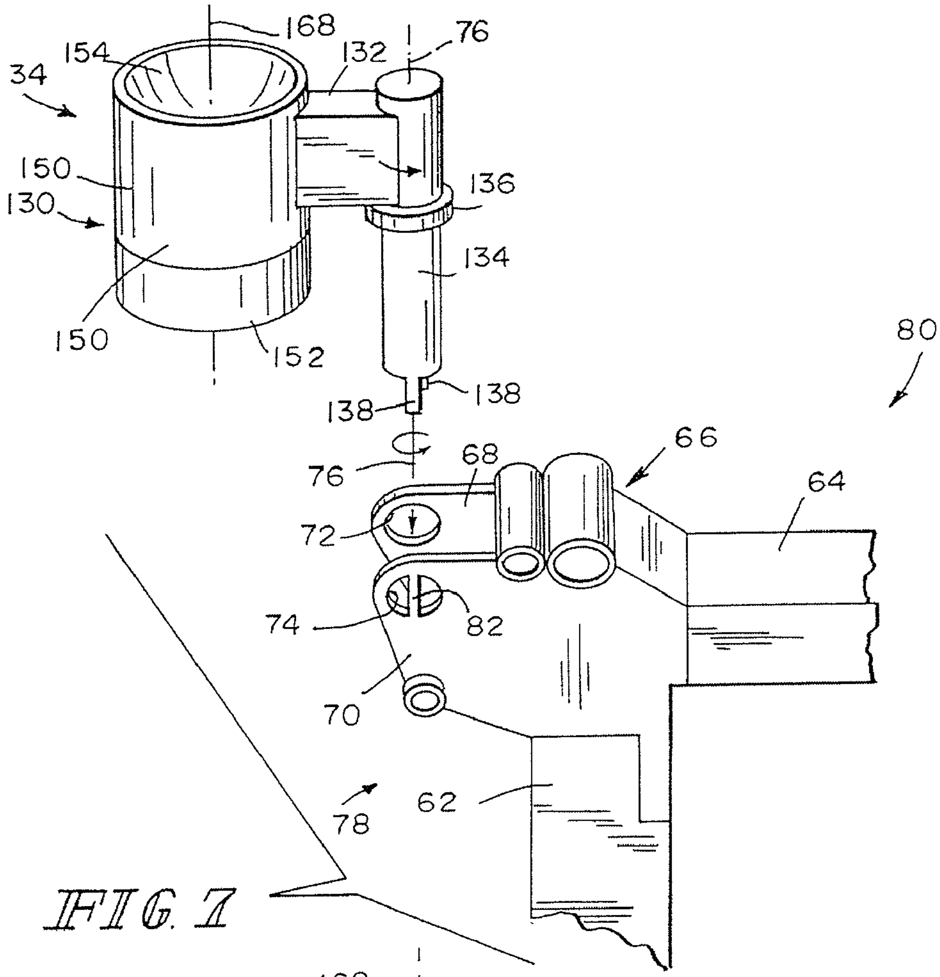
FIG. 7 is a bottom perspective view of a corner portion of an intermediate frame of the bed carrying the lower spherical socket assembly and showing the lower spherical socket pivoted to a position near a head end of the bed.
Figure 8:
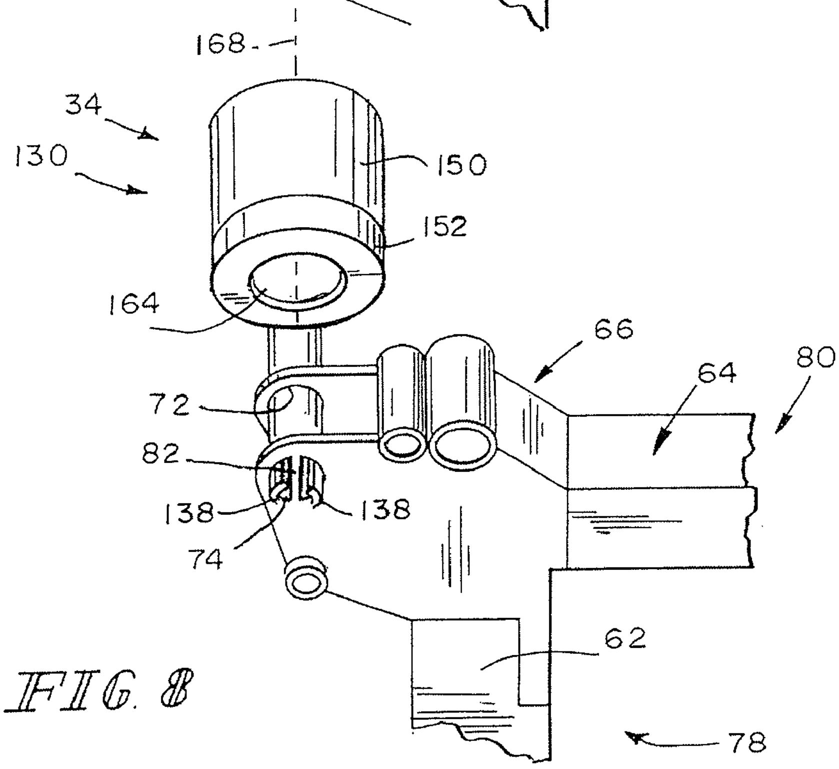
FIG. 8 is a bottom perspective view, similar to FIG. 7, showing the lower spherical socket pivoted to a position near a right side of the bed.

The hospital bed 36 illustratively includes a lower frame 50 supported on casters 52, an intermediate frame 54 supported above lower frame 50 for movement relative to lower frame 50 between raised and lowered positions, and a deck 56 supported above intermediate frame 54. In some embodiments, the intermediate frame 54 includes multiple frames, such as an upper frame and a weigh frame. A mattress 58 is supported on the deck 56. Illustratively, the deck 56 includes longitudinally spaced head, seat, thigh and leg sections (not shown). An elevation adjustment mechanism 60 connects the intermediate frame 54 to the lower frame 50. Illustratively, the intermediate frame 54 includes a head-end frame member 62 (FIGS. 7-8), a foot end frame member (not shown), a left side frame member (not shown), and a right side frame member 64 (FIGS. 7-8). The head and foot end frame members 62 and the left and right side frame members 64 are joined together by corner brackets 66 to form the intermediate frame 54.

The elevation adjustment mechanism 60 is operable to raise, lower, and tilt the intermediate frame 54 relative to the lower frame 50. For example, the elevation adjustment mechanism 50 is operable to tilt the intermediate frame 54 between a Trendelenburg position in which the head end of the intermediate frame 54 is below the foot end of the intermediate frame 54 and a reverse Trendelenburg positions in which the head end of the intermediate frame 54 is above the foot end of the intermediate frame 54. In the illustrated embodiment, the upward and downward movement of the intermediate frame 54 carrying the lower spherical socket assembly 34 facilitates transfer of the equipment support 20 between the column 32 and the bed 36. Alternatively or additionally, the column 32 may have an actuator for raising and lowering the upper spherical socket assembly 30 to effect transfer of the equipment support 20 between the column 32 and the bed 36.

The patient care equipment 24 may be, for example, any one or more of the following: heart monitoring equipment, medical gas delivery equipment, infusion management equipment, equipment monitors, patient monitors, defibrillators, IV poles, and the like, many of which are directly connected to a patient via lines or tubes. A column supported by a wall-mounted radial arm is disclosed in U.S. Pat. No. 7,065,811, which is hereby incorporated by reference herein. A commercial example of such an arm system is the Latitude® Arm System marketed by Hill-Rom Company, Inc. of Batesville, Ind. A column having an actuator to raise and lower the upper spherical socket assembly 30 is disclosed in a U.S. Patent Application, Publication Number US-2006-0242763-A1. Illustratively, a bed having an elevation adjustment mechanism is disclosed in U.S. Pat. No. 6,163,903, which is hereby incorporated by reference herein. A commercial example of such a bed is the TotalCare® bed marketed by Hill-Rom Company, Inc. of Batesville, Ind. Illustratively, a wheeled equipment support cart or dolly and a floor-supported stand suitable for use with the equipment support 20 are disclosed in U.S. Pat. No. 7,065,812, which is hereby incorporated by reference herein.

Figure 12:
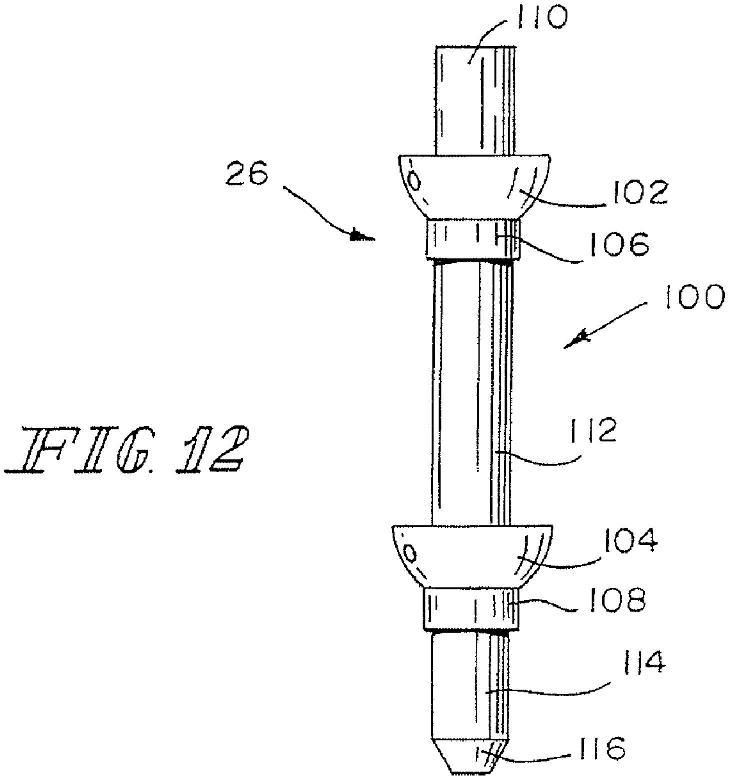
FIG. 12 is a front elevation view of the post, the upper and lower spherical portions, the upper and lower cylindrical portions, and a tapered lower end.

As indicated above, the equipment support 20 includes the equipment supporting portion 22 and the coupler 26 that extends downwardly from the equipment supporting portion 22. As shown in FIGS. 1 and 12, the coupler 26 comprises a generally cylindrical post 100, an upper generally spherical portion 102 coupled to the post 100, and a lower generally spherical portion 104 coupled to the post 100 below the upper generally spherical portion 102. In the illustrated embodiment, the spherical portions 102, 104 are generally hemispherical. A first generally cylindrical portion 106 projects downwardly from the upper spherical portion 102. A second generally cylindrical portion 108 projects downwardly from the lower spherical portion 104. The first and second cylindrical portions 106, 108 each has a diameter greater than a diameter of the post 100. In the illustrated embodiment, the cylindrical portions 106, 108 are integrally formed with the respective spherical portions 102, 104. Illustratively, the spherical portions 102, 104 and cylindrical portions 106, 108 each has a central bore through which the post 100 extends.

The post 100 has a first portion 110 that extends above the upper spherical portion 102, a second portion 112 that extends between the upper and lower spherical portions 102, 104, and a third portion 114 that extends below the lower spherical portion 104. The post 100 is tapered at a lower end 116 of the third portion 114. The post 100 may be made from any suitable material which offers high strength, light weight and rigidity, such as aluminum, steel, and the like. The spherical portions 102, 104 and cylindrical portions 106, 108 may be made from any suitable material which offers high strength, toughness and rigidity, such as Celcon®, Delrin®, and the like. The term "spherical" as used in this specification and claims means "generally spherical." The term "spherical"

as used in this specification and claims does not mean exactly spherical or comprising a whole sphere.

Figure 3:
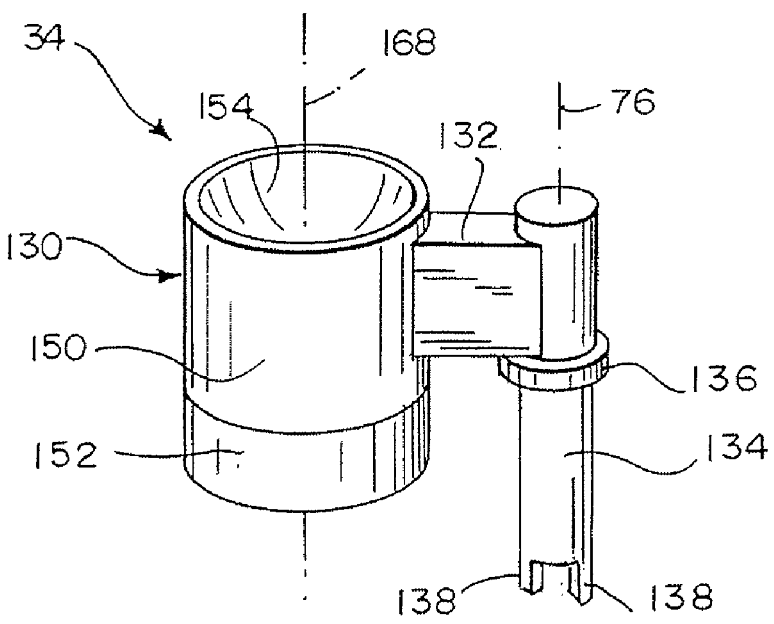
FIG. 3 is a perspective view of a bed-mounted lower spherical socket assembly having the lower spherical socket.

As shown in FIG. 2, in the illustrated embodiment, the lower spherical socket assembly 34 is coupled to the corner bracket 66 located at the intersection of the head end and right side frame members 62, 64 (FIGS. 7-8) of the intermediate frame 54 of the bed 36. As shown in FIG. 3, the socket assembly 34 includes a lower generally spherical socket 130, an arm 132 that extends outwardly from the socket 130, and a shaft 134 that extends downwardly from the arm 132. As shown in FIGS. 7-8, each corner bracket 66 includes a pair of vertically-spaced flanges 68, 70 having respective openings 72, 74 that are vertically aligned. The shaft 134 extends through the openings 72, 74 in the respective flanges 68, 70. The shaft 134 carries a collar 136 (FIG. 3) that rests against the upper flange 68. The socket assembly 34 is rotatable about a generally vertical axis 76 between a position near a head end 78 of the bed 36 as shown in FIG. 7 and a position near a right side 80 of the bed 36 as shown in FIG. 8.

Such pivoting movement of the socket assembly 34 allows positioning of the equipment support 20 close to an end of the bed 36 so that the equipment support 20 and the bed 36 can pass through a narrow passage, such as, for example, an elevator door. In addition, such pivoting movement of the socket assembly 34 allows positioning of the equipment support 20 close to a side of the bed 36 so that the equipment support 20 and the bed 36 can fit into a small space, such as, for example, an elevator. As shown in FIGS. 3, 7-8, the lower end of the shaft 134 is formed to include a pair of fingers 138. When the shaft 134 is inserted into the openings 72, 74 in the flanges 68, 70, the fingers 138 of the shaft 134 are disposed on opposite sides of a tab 82 that extends across the lower opening 74 in the lower flange 70. The fingers 138 cooperate with the tab 82 to define the respective stopping points for the socket assembly 34 near the head end 78 and near the right side 80 of the bed 36.

Figure 17:
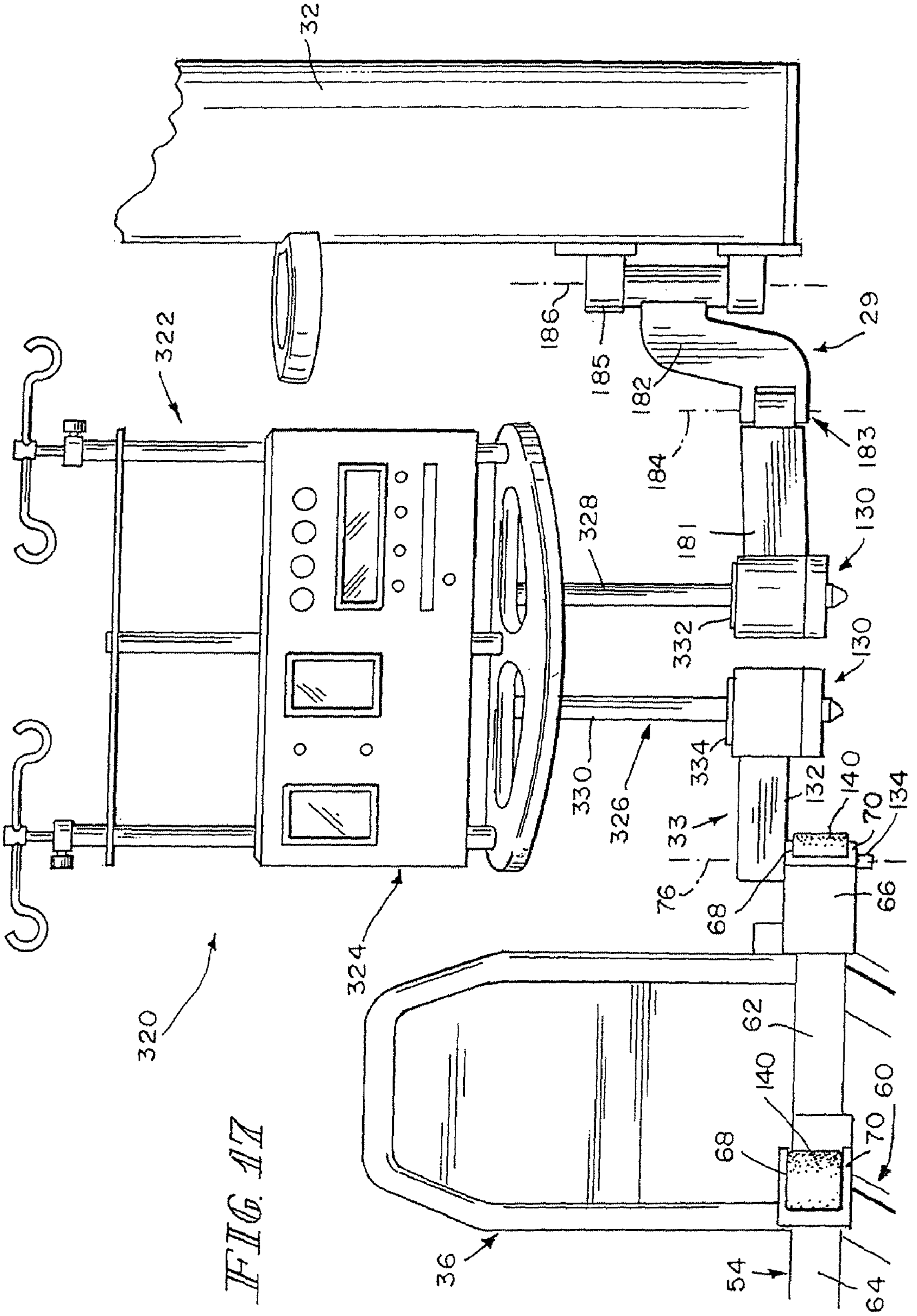
FIG. 17 is a perspective view showing the equipment support of FIG. 15 being transferred from the generally spherical socket carried by the column to a generally spherical socket carried by the bed.
Figure 18:
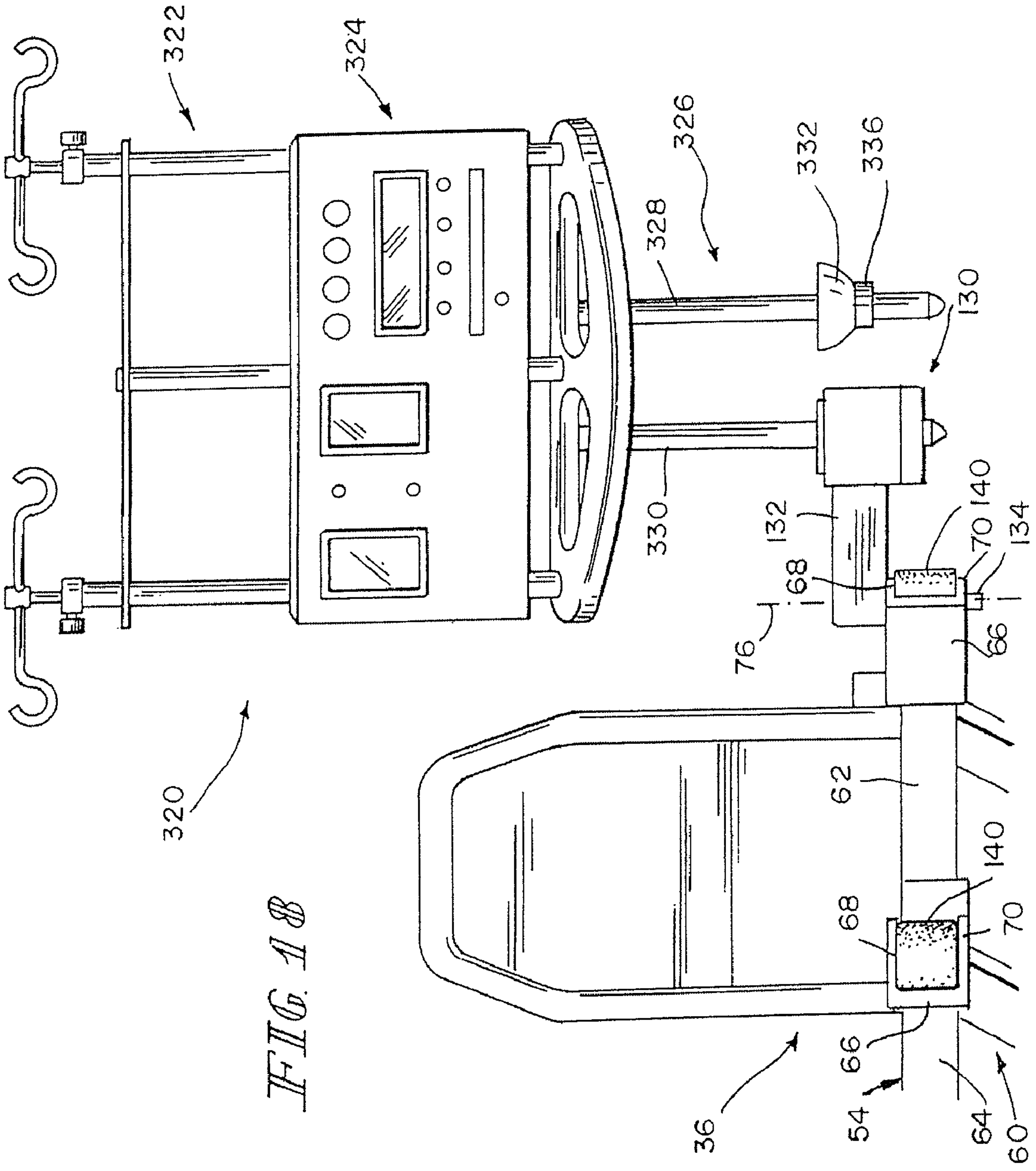
FIG. 18 is a perspective view showing the equipment support of FIG. 15 supported by the bed-mounted spherical socket.
Figure 19:
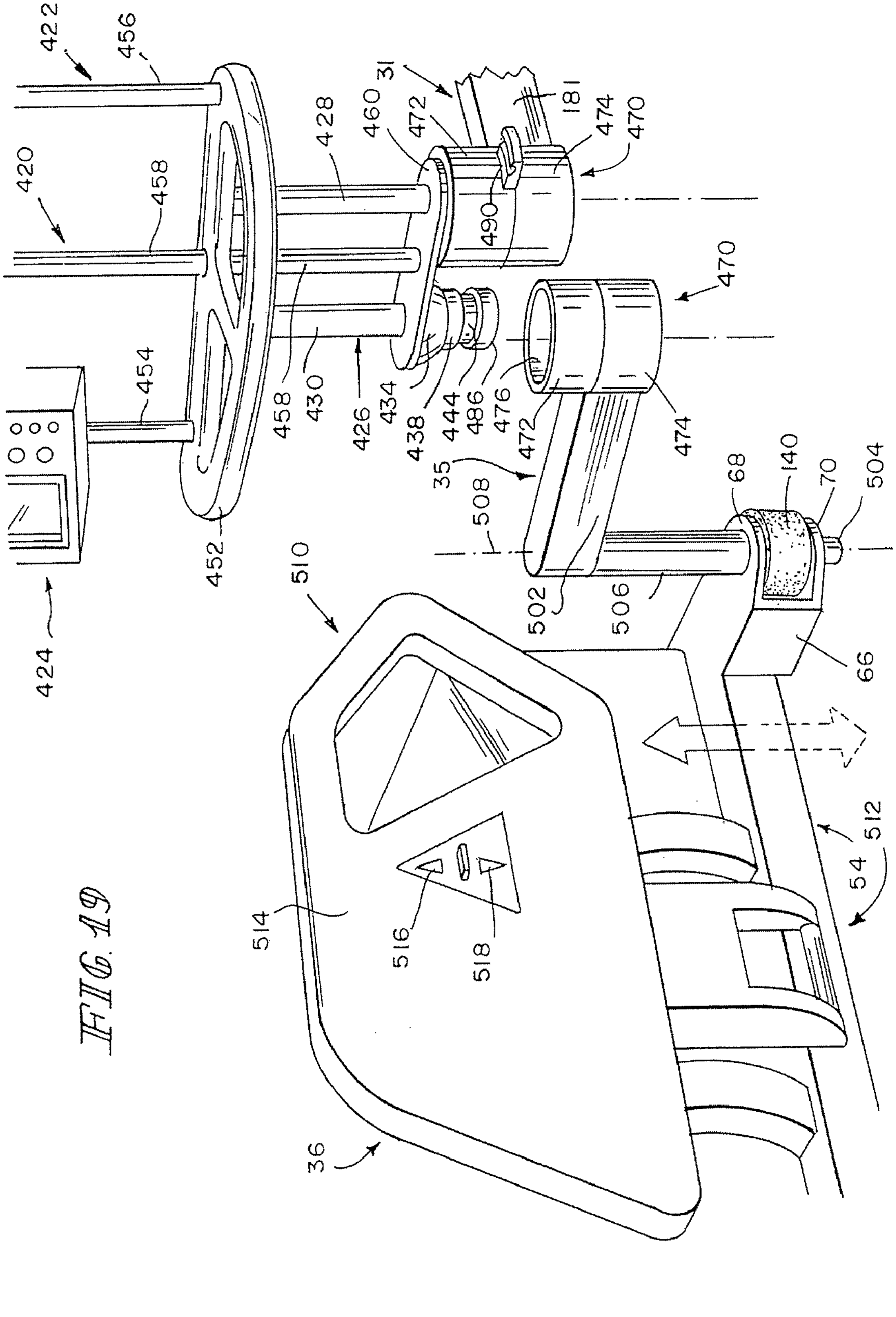
FIG. 19 is a partial perspective view of a third embodiment of the transferable patient care equipment support showing the equipment support being transferred from a generally spherical socket carried by the column to a generally spherical socket carried by the bed, and further showing the equipment support comprising an equipment supporting portion, first and second posts extending downwardly from the equipment supporting portion, first and second generally spherical portions coupled to lower ends of the respective first and second posts, and first and second generally cylindrical portions projecting downwardly from the respective first and second spherical portions.

In some embodiments, as shown, for example, in FIGS. 17-19, roller bumpers 140 are rotatably mounted in bumper-receiving spaces defined by the upper and lower flanges 68, 70 of the corner brackets 66. In such embodiments, a fastener, such as the shaft 134, extends through openings 72, 74 in the flanges 68, 70 and through bores in the roller bumpers 140 to mount the roller bumpers 140 to the corner brackets 66. The bumpers 140 protect the bed 36 from accidental or incidental contact with the walls, service columns, carts, stands, and the like.

Figure 4:
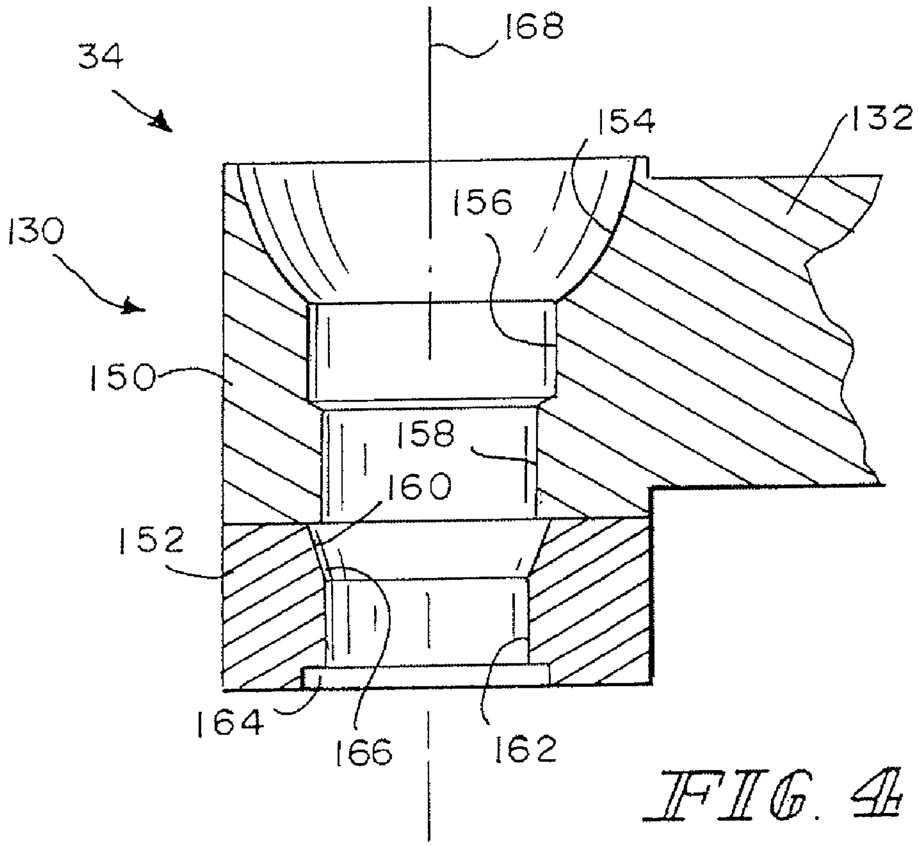
FIG. 4 is a cross sectional view of the lower spherical socket having an upwardly-opening generally spherical cavity for receiving the lower spherical portion, a bore having a diameter larger than a diameter of the lower cylindrical portion, a bore having a diameter larger than a diameter of the post, and an upwardly-opening conical cavity for guiding a lower end of the post into a bore that opens through a bottom surface of the socket.
Figure 5:
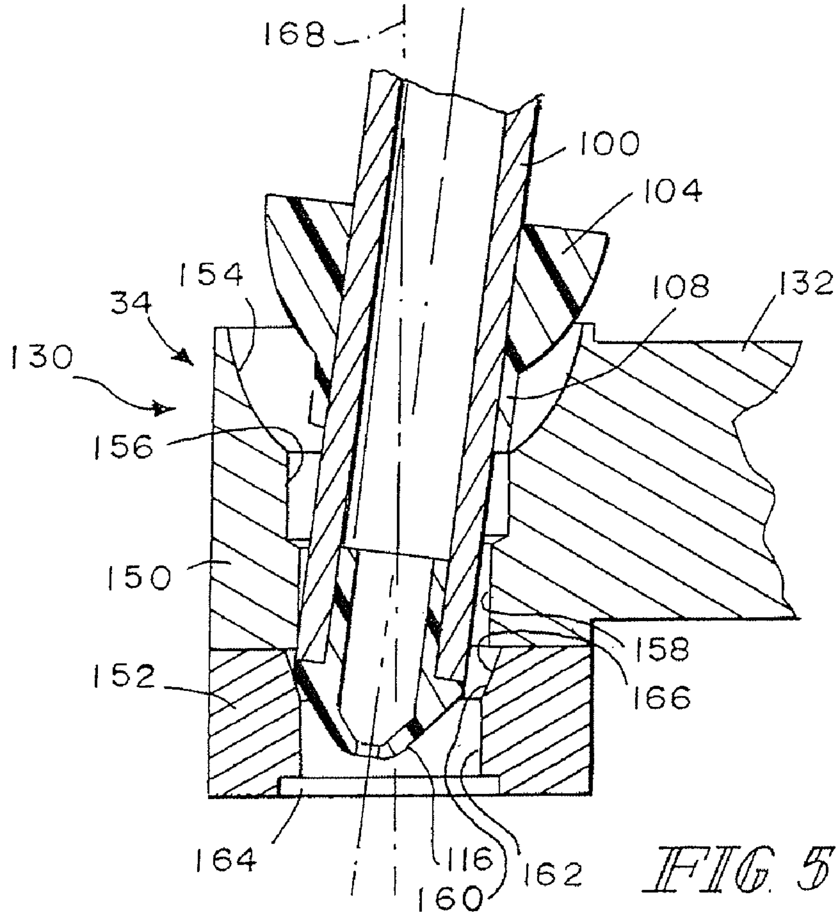
FIG. 5 is a cross sectional view, similar to FIG. 4, showing the post being inserted into the lower spherical socket at an angle, with a bottom lead-in portion of the post engaging a tapered side wall of the upwardly-opening conical cavity in the socket.
Figure 6:
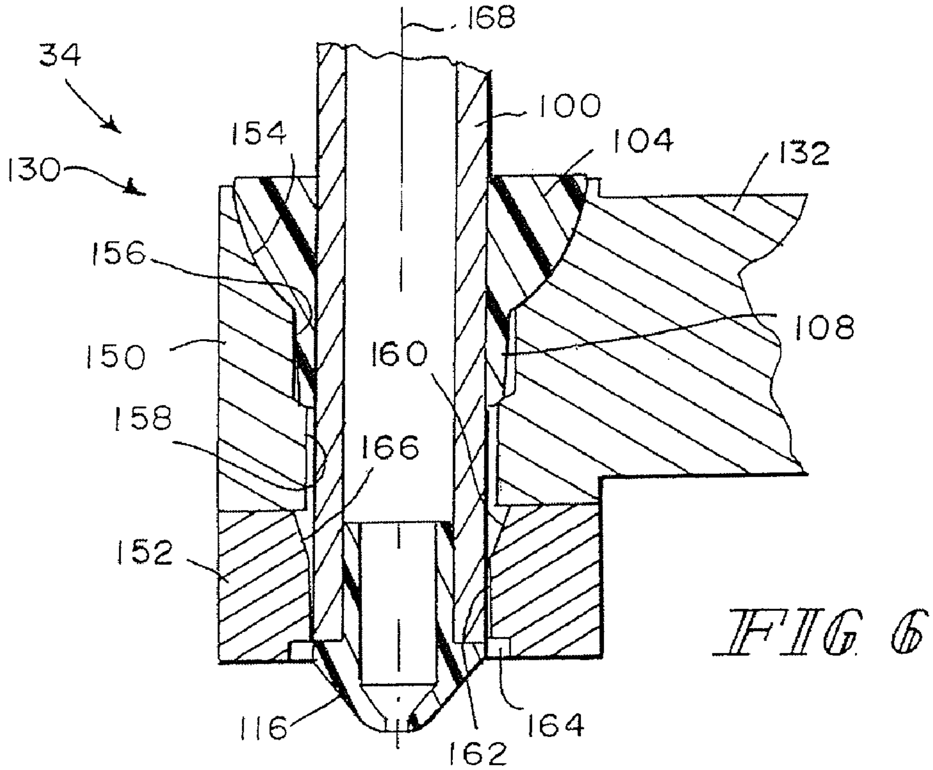
FIG. 6 is a cross sectional view, similar to FIG. 5, but showing the post fully inserted into the lower spherical socket, with the lower spherical portion of the equipment support seated in the upwardly-opening spherical cavity in the socket, the lower cylindrical portion received in the bore in the socket, and the bottom lead-in portion of the post extending through the bore in the bottom surface of the socket.

As shown in FIGS. 4-6, in the illustrated embodiment, the socket 130 has upper and lower cylindrical portions 150, 152 that are joined together by suitable fasteners, such as pins, screws, studs, and the like. The upper portion 150 has an upwardly-opening generally spherical cavity 154 near its upper end that is configured to receive the lower spherical portion 104 of the coupler 26, a bore 156 that has a diameter slightly greater than the outside diameter of the cylindrical portion 108 of the coupler 26, and a bore 158 near its lower end that has a diameter slightly greater than the outside diameter of the post 100. The lower portion 152 has an upwardly-opening generally conical cavity 160 near its upper end that is configured to guide the lower tapered end 116 of the post 100 into a bore 162 that has a diameter slightly greater than the outside diameter of the post 100. The lower portion 152 has a large diameter bore 164 near its lower end through which the post 100 extends when it is fully inserted into the socket 130 as shown in FIG. 6. When the post 100 is inserted into the lower spherical socket 130 at an angle, as shown, for example, in FIG. 5, the lower tapered end 116 of the post 100 engages a tapered side wall 166 of the upwardly-opening conical cavity 160 in the socket 130. The tapered side wall 164 then guides the post 100 into the bore 162 during downward movement of the post 100 (or upward movement of the socket 130 or a combination of the two) as shown in FIG. 6.

Figure 9:
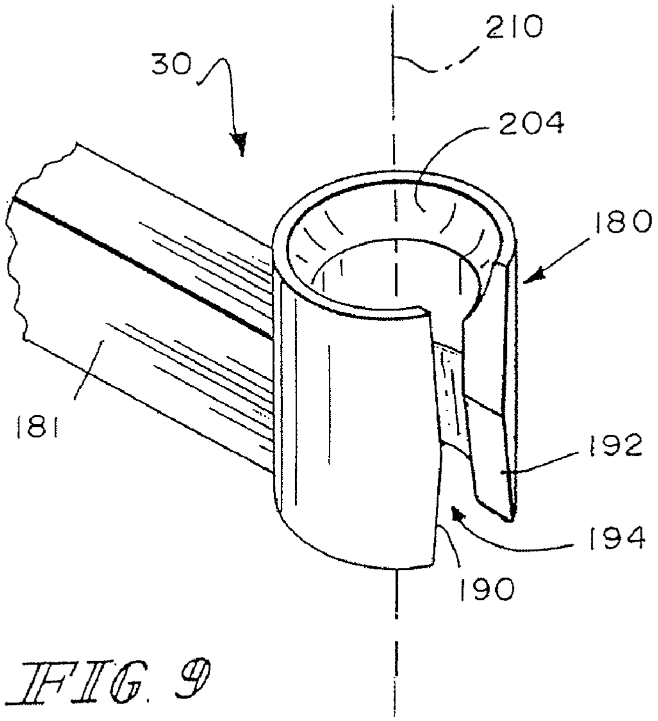
FIG. 9 is a perspective view of a column-mounted upper spherical socket assembly having the upper spherical socket.
Figure 10:
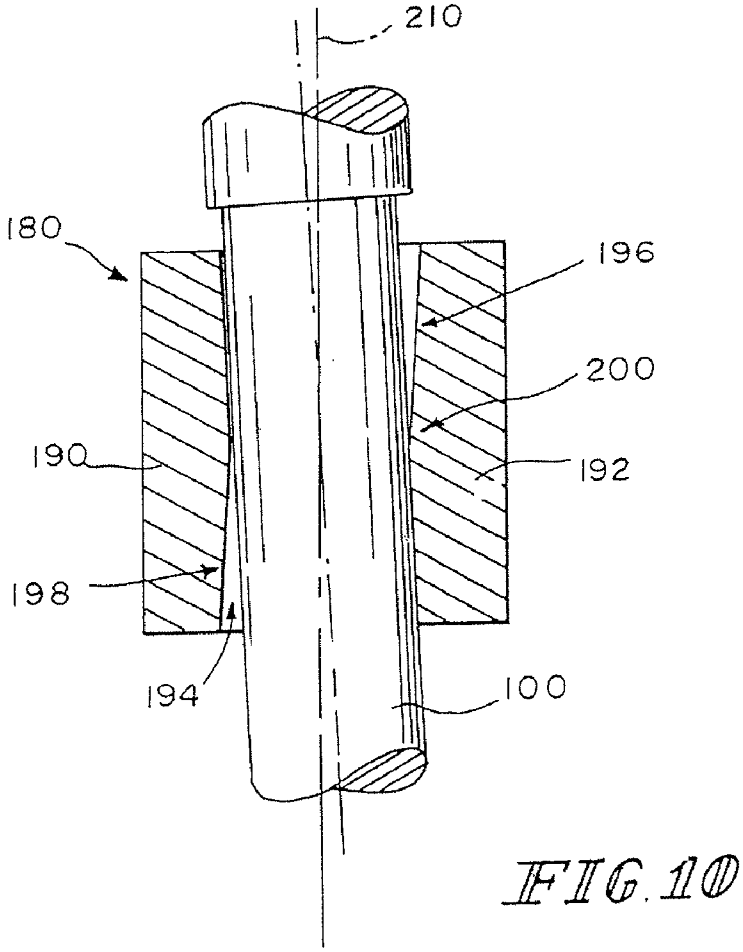
FIG. 10 is a front elevation view showing a post being inserted into the upper spherical socket through a laterally outwardly-opening slot therein.

In the illustrated embodiment, the upper spherical socket assembly 30 is coupled to the column 32. As shown in FIG. 2, the socket assembly 30 includes an upper generally spherical socket 180, a straight arm 181 that extends outwardly from the socket 180, a bent arm 182, a coupler 183 for coupling the straight arm 181 to the bent arm 182 for pivoting movement about a first pivot axis 184, and a bracket 185 for coupling the bent arm 182 to the column 32 for pivoting movement about a second pivot axis 186. Suitable fasteners, such as pins, studs, threaded screws and the like, may be used for securing the bracket 185 to the column 32. As shown in FIGS. 9-10, the socket 180 has a generally c-shaped cross section having spaced apart end portions 190, 192 which define a laterally outwardly-opening slot 194 through which the post 100 of the coupler 26 is inserted into the socket 180 during transfer of the equipment support from the bed 36 to the column 32.

As shown in FIG. 10, the outwardly-opening slot 194 has an hourglass configuration in a front elevation view. The slot 194 has an upper portion 196, a lower portion 198 and a neck portion 200 formed at the juncture of the upper and lower portion 196, 198. The neck portion 200 has a width that is greater than a diameter of the post 100. The upper portion 196 progressively decreases in width and the lower portion 198 progressively increases in width to allow the post 100 to be inserted into the socket 180 at an angle relative to a vertical axis 210 of the socket 180 as shown, for example, in FIG. 10. The hourglass configuration of the slot 194 compensates for any misalignment between the post 100 and the upper spherical socket 180 during transfer of the equipment support 20 between the bed 36 and the column 32. A number of factors, such as, for example, the floor supporting the bed 36 not being horizontal, the intermediate frame 54 supporting the lower spherical socket 130 not being horizontal, the column 32 not being vertical, contribute to the misalignment between the post 100 and the upper spherical socket 180.

Figure 11:
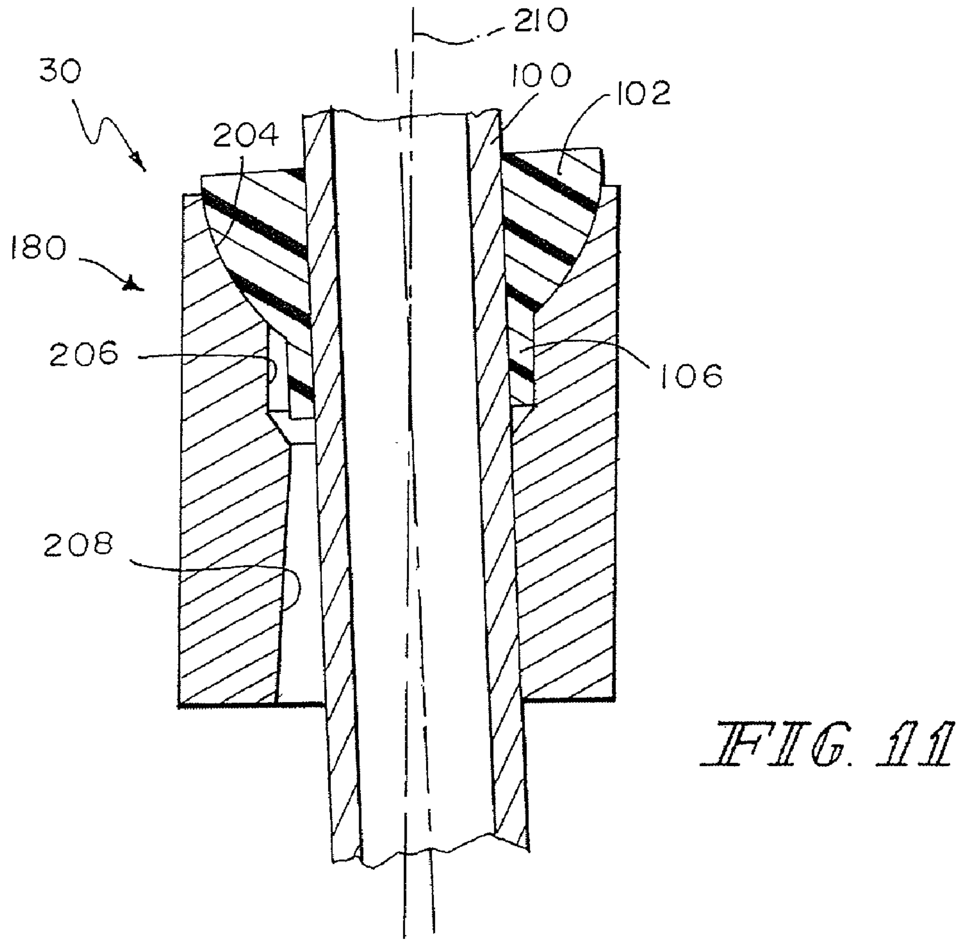
FIG. 11 is a cross sectional view of the upper spherical socket showing the upper spherical portion seated in an upwardly-opening generally spherical cavity in the upper spherical socket, the upper cylindrical portion received in a bore in the socket, and the post extending through a bore in the socket.

As shown in FIG. 11, the socket 180 has an upwardly-opening generally spherical cavity 204 near its upper end that is configured to receive the upper spherical portion 102 of the coupler 26, a bore 206 that has a diameter slightly greater than the outside diameter of the cylindrical portion 106 of the coupler 26 and a bore 208 near its lower end that flares outwardly in the downward direction. As shown in FIG. 11, the diameter of the downwardly-flaring bore 208 is substantially larger than the diameter of the post 100 to allow the upper spherical portion 102 of the coupler 26 to swivel side-to-side in the upwardly-opening spherical cavity 204 to compensate for any misalignment between the coupler 26 and the upper spherical socket 180 and/or between the coupler 26 and the lower spherical socket 130.

The equipment support 20 can be transferred from the column 32 to the bed 36 by either raising the intermediate frame 54 carrying the lower spherical socket 130 or by lowering the upper spherical socket assembly 30 carrying the upper spherical socket 180 (or by a combination of the two) after moving the column 32 to a location where the lower spherical portion 104 of the coupler 26 is positioned over the bed-mounted lower spherical socket 130. Transfer of the equipment support 20 from the column 32 to the bed 36 by raising the intermediate frame 54 carrying the lower spherical socket 130 will be described first. Transfer of the equipment support 20 from the column 32 to the bed 36 by lowering the upper spherical socket assembly 30 carrying the upper spherical socket 180 will be described next.

To transfer equipment support 20 from the column 32 to the bed 36, the column 32 is moved to a position where the lower spherical portion 104 of the coupler 26 is generally aligned over the lower spherical socket 130 carried by the intermediate frame 54 of the bed 36 and the intermediate frame 54 is raised. As the intermediate frame 54 moves upwardly, the lower spherical portion 104 of the coupler 26 enters the upwardly-opening spherical cavity 154 in the lower spherical socket 130 and, when this initially occurs, the upper spherical portion 102 of the coupler 26 is still seated in the upwardly-opening spherical cavity 204 in the upper spherical socket 180 carried by the column 32. Further upward movement of the intermediate frame 54 causes the lower spherical portion 104 of the coupler 26 to seat firmly in the upwardly-opening spherical cavity 154 in the lower spherical socket 130 and causes the upper spherical portion 102 of the coupler 26 to lift upwardly out of upwardly-opening spherical cavity 204 in the upper spherical socket 180. After the upper spherical portion 102 of the coupler 26 is raised sufficiently relative to upper spherical socket 180, the column 32 can then be pulled away from the bed 36 (or the bed 36 pulled away from the column 32), with the bed 36 carrying the equipment support 20. The column 32 can be pulled away from the bed 36 (or the bed 36 pulled away from the column 32) by virtue of the fact that the slot 194 in the column-mounted upper spherical socket 180 is wider than the diameter of the intermediate portion 112 of the post 100 and the height of the intermediate portion 112 of the post 100 is greater than the height of upper spherical socket 180. In such embodiments, where raising of the intermediate frame 54 effects transfer of the equipment support 20 from the column 32 to the bed 36, the column 32 need not have a mechanism for raising and lowering the column-mounted upper spherical socket 180.

Alternately or additionally, to transfer the equipment support 20 from the column 32 to the bed 36, the column 32 is moved to a position where the lower spherical portion 104 of the coupler 26 is generally aligned over the bed-mounted lower spherical socket 130 and the upper spherical socket 180 carried by the column 32 is lowered to a position where the lower spherical portion 104 is seated firmly in the upwardly-opening spherical cavity 154 in the lower spherical socket 130 and the upper spherical socket 180 is positioned below the upper spherical portion 102 of the coupler 26. The column 32 can then be pulled away from the bed 36 (or the bed 36 pulled away from the column 32), with the bed 36 carrying the equipment support 20. In such embodiments, where lowering of the column-mounted upper spherical socket 180 effects transfer of the equipment support 20 from the column 32 to the bed 36, the bed 36 need not have the elevation adjustment mechanism 60 for raising and lowering the intermediate frame 54 carrying the lower spherical socket 130.

To transfer the equipment support 20 from the bed 36 to the column 32, the sequence of steps is reversed. The equipment support 20 can be transferred from the bed 36 to the column 32 by either lowering the intermediate frame 54 carrying the lower spherical socket 130 or by raising the upper spherical socket assembly 30 carrying the upper spherical socket 180 (or by a combination of the two) after moving the column 32 to a location where the column-mounted upper spherical socket 180 is positioned around the intermediate portion 112 of the post 100. Transfer of the equipment support 20 from the bed 36 to the column 32 by lowering the intermediate frame 54 carrying the lower spherical socket 130 will be described first. Transfer of the equipment support 20 from the bed 36 to the column 32 by raising the upper spherical socket assembly 30 carrying the upper spherical socket 180 will be described next.

To transfer equipment support 20 from the bed 36 to the column 32, the column 32 is moved to a location where the upper spherical socket 180 carried by the column 32 is positioned around the intermediate portion 112 of the post 100 and then the intermediate frame 54 of the bed 36 carrying the lower spherical socket 130 is lowered. As the intermediate frame 54 moves downwardly, the upper spherical portion 102 of the coupler 26 enters the upwardly-opening spherical cavity 204 in the upper spherical socket 180 and, when this initially occurs, the lower spherical portion 104 of the coupler 26 is still seated in the upwardly-opening spherical cavity 154 in the lower spherical socket 130. Further downward movement of the intermediate frame 54 causes the upper spherical portion 102 of the coupler 26 to seat firmly in the upwardly-opening spherical cavity 204 in the upper spherical socket 180 and causes the lower spherical portion 104 of the coupler 26 to lift upwardly out of lower spherical socket 130. After the lower spherical socket 130 is lowered sufficiently relative to the lower spherical portion 104, the column 32 can then be pulled away from the bed 36 (or the bed 36 pulled away from the column 32), with the column 32 carrying the equipment support 20. In such embodiments, where lowering of the intermediate frame 54 effects transfer of the equipment support 20 from the bed 36 to the column 32, the column 32 need not have a mechanism for raising and lowering the upper spherical socket 180.

Alternately or additionally, to transfer the equipment support 20 from the bed 36 to the column 32, the column 32 is moved to a location where the column-mounted upper spherical socket 180 is positioned around the intermediate portion 112 of the post 100 and then the upper spherical socket 180 is raised to a position where the upwardly-opening spherical cavity 204 in the upper spherical socket 180 engages the upper spherical portion 102 of the coupler 26 and lifts the equipment support 20 off the lower spherical socket 130 permitting the column 32 to move away from the bed 36 (or the bed 36 to move away from the column 32), with the column 32 carrying the equipment support 20. In such embodiments, where raising of the column-mounted upper spherical socket 180 effects transfer of the equipment support 20 from the bed 36 to the column 32, the bed 36 need not have the elevation adjustment mechanism 60 for raising and lowering the intermediate frame 54 carrying the lower spherical socket 130.

Within a range of movement, the upper and lower spherical portions 102, 104 are able to rotate within the respective upper and lower spherical sockets 180, 130 about a multitude of axes to compensate for any misalignment between the coupler 26 and at least one of the upper and lower spherical sockets 180, 130 during transfer of the equipment support 20 between the column 32 and the bed 36. This ability of the upper and lower spherical portions 102, 104 to rotate within the respective upper and lower spherical sockets 180, 130 reduces the potential for binding of these parts during the transfer of the equipment support 20 between the column 32 and the bed 36. A number of factors, such as, for example, the floor supporting the bed 36 not being horizontal, the intermediate frame 54 supporting the lower spherical socket 130 not being horizontal, the column 32 not being vertical, contribute to the misalignment between the coupler 26 and at least one of the upper and lower spherical sockets 180, 130 during transfer of the equipment support 20 between the column 32 and the bed 36. This arrangement has been found to be an improvement over the use of frustoconical connectors and sockets which are less forgiving with regard to misalignment, resulting in binding.

Figure 13:
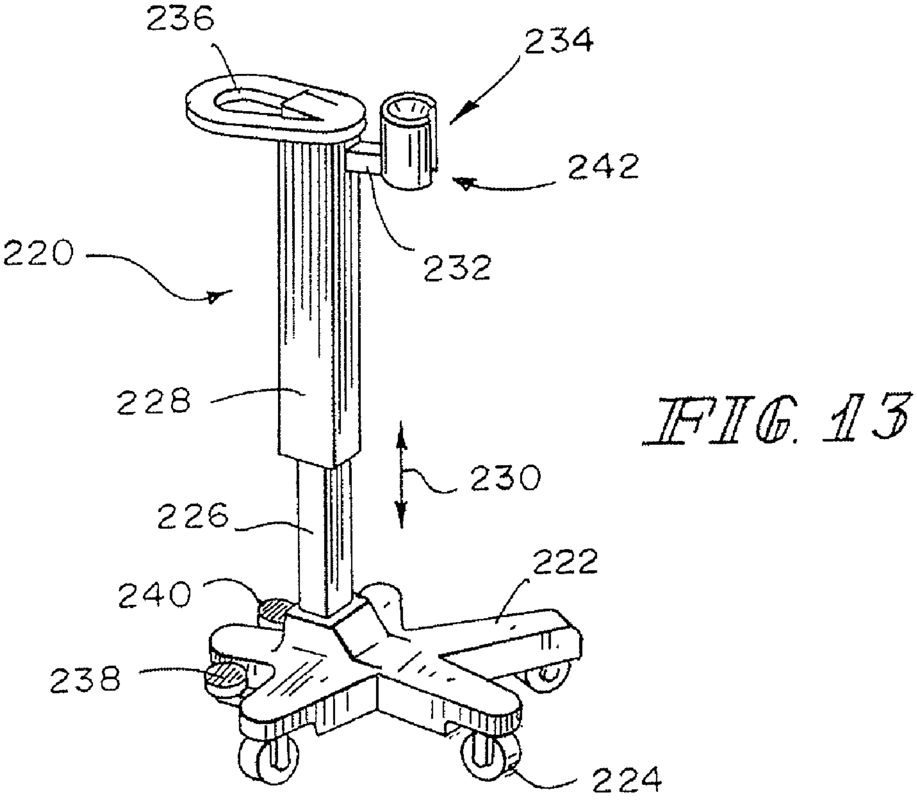
FIG. 13 is a perspective view of an equipment support cart suitable for use with the equipment support of FIG. 1.
Figure 14:
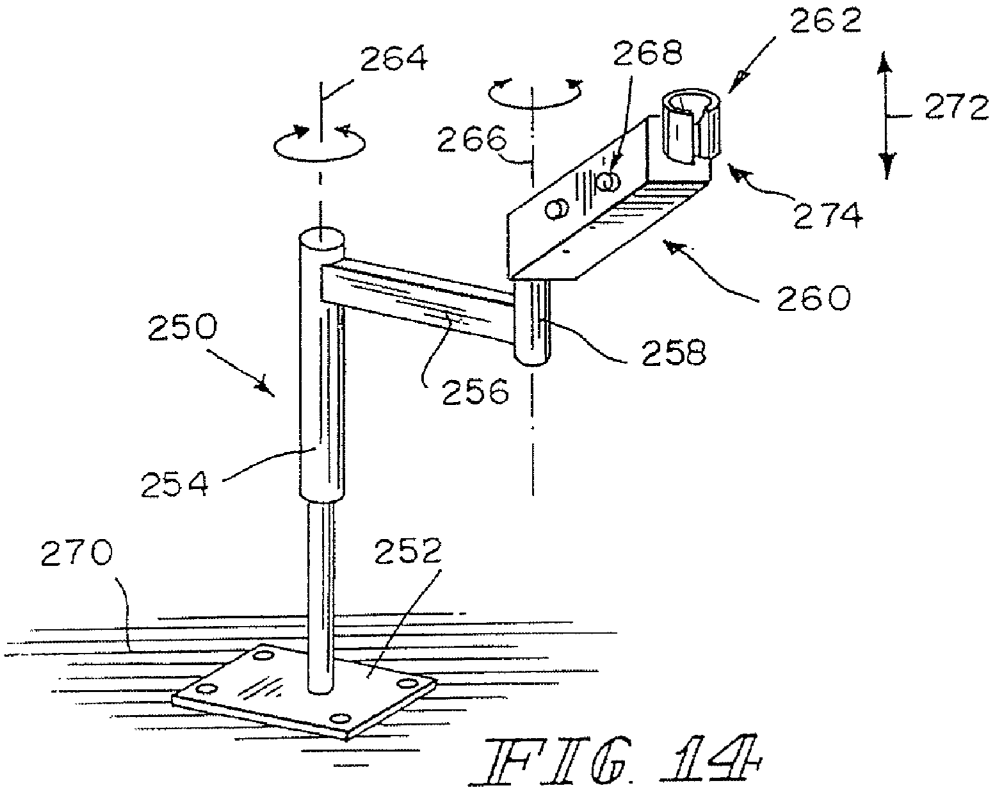
FIG. 14 is a perspective view, similar to FIG. 13, of a floor-mounted stand suitable for use with the equipment support of FIG. 1.

As indicated above, the equipment support 20 may be transferred between a patient support, such as the bed 36, and a support structure, such as, for example, an equipment support cart 220 shown in FIG. 13 or a floor-supported stand 250 shown in FIG. 14. The cart 220 includes a base 222 having wheels 224, a post 226 extending upwardly from the base 224, a telescoping column 228 that telescopes relative to the post 226 in a vertical direction 230, a bracket 232 coupled to column 228 and carrying an upper generally spherical socket 234, a handle 236 coupled to the column 228, a lift pedal 238 to extend the telescoping column 228 upwardly and a release pedal 240 to retract the telescoping column 228 downwardly. Bearings (not shown) may be provided to facilitate telescoping movement of the column 228 relative to the post 226. Illustratively, the column 228 may have between 30 centimeters and 45 centimeters of telescoping movement in the vertical direction 230. Construction of the upper spherical socket 234 shown in FIG. 13 is similar to the upper spherical socket 180 having an open configuration and shown in FIGS. 9-11. An illustrative equipment support cart is disclosed in U.S. Pat. No. 7,065,812.

When it is desired to transfer the equipment support 20 from the bed 36 to the cart 220, the cart 220 is moved to a position where the upper spherical socket 234 carried by the cart 220 is positioned around the intermediate portion 112 of the post 100 and then the intermediate frame 54 of the bed 36 carrying the lower spherical socket 130 is lowered. The intermediate portion 112 of the post 100 is allowed to enter the cart-mounted upper spherical socket 234 through a slot 242 therein. As the intermediate frame 54 moves downwardly, the upper spherical portion 102 of the coupler 26 enters the upper spherical socket 234 and, when this initially occurs, the lower spherical portion 104 of the coupler 26 is still received in the lower spherical socket 130. Further downward movement of the intermediate frame 54 causes the upper spherical portion 102 of the coupler 26 to seat firmly in the upper spherical socket 234 and causes the lower spherical portion 104 of the coupler 26 to lift upwardly out of the lower spherical socket 130. After the lower spherical socket 130 is lowered sufficiently relative to the lower spherical portion 104, the cart 220 can then be pulled away from the bed 36 (or the bed 36 pulled away from the cart 220), with the cart 220 carrying the equipment support 20. In such embodiments, where lowering of the intermediate frame 54 effects transfer of the equipment support 20 from the bed 36 to the cart 220, the cart 220 need not have the telescoping column 228 or other mechanism for raising and lowering the upper spherical socket 234.

Alternately or additionally, when it is desired to transfer the equipment support 20 from the bed 36 to the cart 220, the cart 220 is moved to a position where the cart-mounted upper spherical socket 234 is positioned around the intermediate portion 112 of the post 100 and then the lift pedal 238 is actuated to extend the telescoping column 228 to, in turn, raise the upper spherical socket 234 to a position where the upper spherical socket 234 engages the upper spherical portion 102 of the coupler 26 and lifts the equipment support 20 off the bed-mounted lower spherical socket 130 permitting the cart 220 to move away from the bed 36 (or the bed 36 to move away from the cart 220), with the cart 220 carrying the equipment support 20. In such embodiments, where raising of the cart-mounted upper spherical socket 234 effects transfer of the equipment support 20 from the bed 36 to the cart 220, the bed 36 need not have the elevation adjustment mechanism 60 for raising and lowering the intermediate frame 54 carrying the lower spherical socket 130. When it is desired to transfer the equipment support 20 from the cart 220 to the bed 36, the sequence of steps is reversed.

As shown in FIG. 14, the stand 250 includes a base 252, a post 254 extending upwardly from the base 252, a cantilevered telescopic arm 256 having a proximal end coupled to the post 254 and extending horizontally away from the post 254, a mount 258 coupled to a distal end of the arm 256 and a 4-bar motorized lift 260 coupled to the mount 258. The lift 260 carries an upper generally spherical socket 262. In the illustrated embodiment, the arm 256 is pivotable about a first vertical axis 264 and the lift 260 is pivotable about a second vertical axis 266. Actuator buttons 268 are located on the lift 260 which can be depressed by a caregiver to raise or lower the upper spherical socket 262 relative to a floor 270 of the hospital room. Illustratively, the lift 260 may have between 30 centimeters and 45 centimeters of movement in a vertical direction 272. Construction of the upper spherical socket 262 shown in FIG. 14 is similar to the upper spherical socket 180 having an open configuration and shown in FIGS. 9-11. An illustrative stand is disclosed in U.S. Pat. No. 7,065,812.

To transfer the equipment support 20 from the stand 250 to the bed 36, the telescoping arm 256 is moved to a position where the lower spherical portion 104 of the coupler 26 is generally aligned over the lower spherical socket 130 carried by the intermediate frame 54 of the bed 36 and the intermediate frame 54 is raised. As the intermediate frame 54 moves upwardly, the lower spherical portion 104 of the coupler 26 enters the lower spherical socket 130 and, when this initially occurs, the upper spherical portion 102 of the coupler 26 is still received in the upper spherical socket 262 carried by the stand 250. Further upward movement of the intermediate frame 54 causes the lower spherical portion 104 of the coupler 26 to seat firmly in the lower spherical socket 130 and causes the upper spherical portion 102 of the coupler 26 to lift upwardly out of the upper spherical socket 262. After the upper spherical portion 102 is raised sufficiently relative to the upper spherical socket 262, the telescoping arm 256 can then retract and swing away from the bed 36 (or the bed 36 can move away from the stand 250), with the bed 36 carrying the equipment support 20. The intermediate portion 112 of the post 100 is allowed to exit the stand-mounted upper spherical socket 262 through a slot 274 therein. In such embodiments, where raising of the intermediate frame 54 effects transfer of the equipment support 20 from the stand 250 to the bed 36, the stand 250 need not have the lift 260 for raising and lowering the upper spherical socket 262.

Alternately or additionally, when it is desired to transfer the equipment support 20 from the stand 250 to the bed 36, the telescoping arm 256 is moved to a position where the lower spherical portion 104 of the coupler 26 is over the bed-mounted lower spherical socket 130. The lift 260 is then actuated to lower the upper spherical socket 262 carrying the equipment support 20 to a position where the equipment support 20 is seated firmly in the bed-mounted lower spherical socket 130. Once the equipment support 20 is seated firmly in bed-mounted lower spherical socket 130, the upper spherical socket 262 can be lowered to a position below the upper spherical portion 102 of the coupler 26 to permit the arm 256 to retract and swing away from the bed 36 (or the bed 36 to move way from the stand 250), with the bed 36 carrying the equipment support 20. In such embodiments, where lowering of the stand-mounted upper spherical socket 262 effects transfer of the equipment support 20 from the stand 250 to the bed 36, the bed 36 need not have the elevation adjustment mechanism 60 for raising and lowering the intermediate frame 54 carrying the lower spherical socket 130. When it is desired to transfer the equipment support 20 from the bed 36 to the stand 250, the sequence of steps is reversed.

Figure 15:
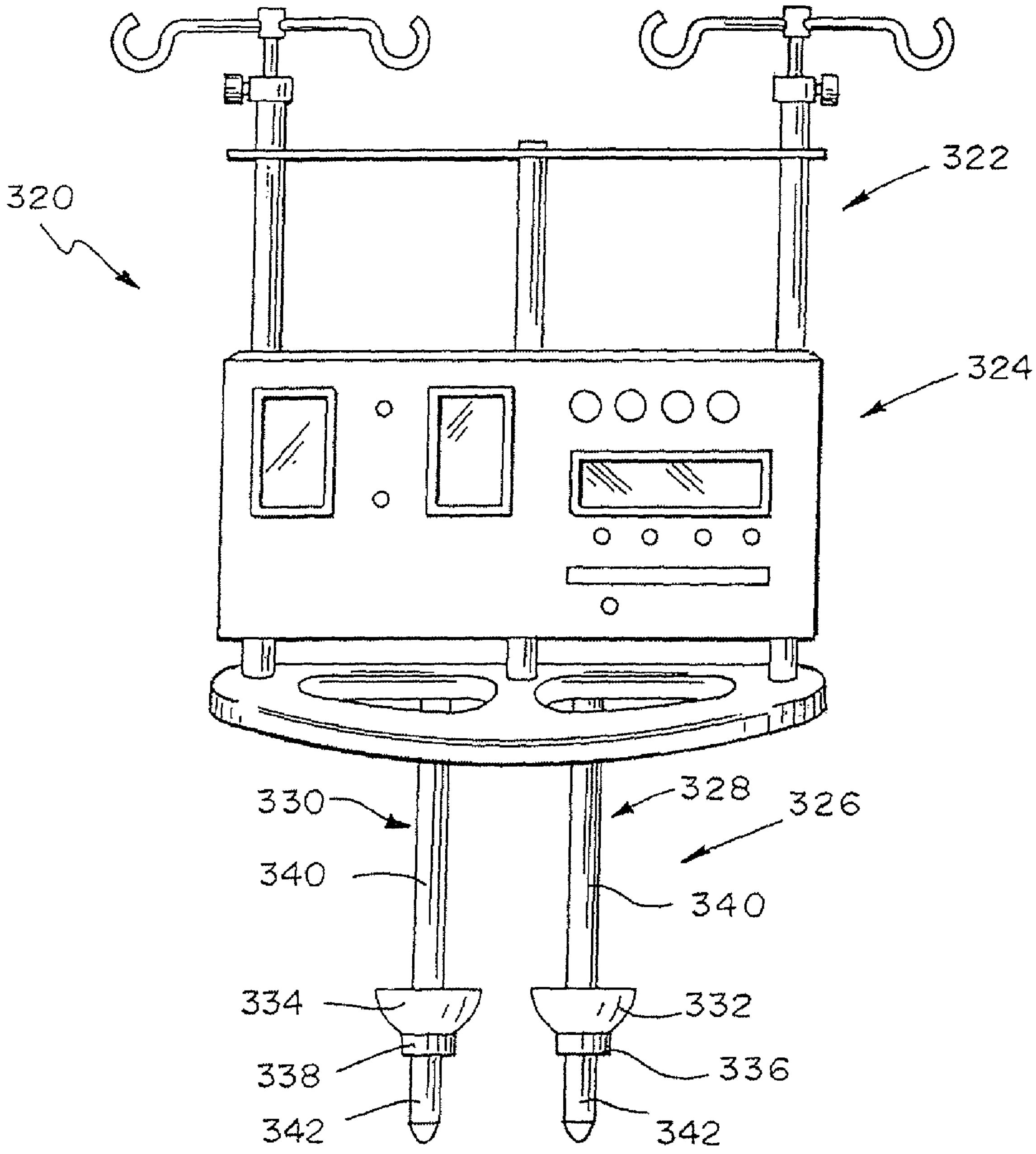
FIG. 15 is a front perspective view of a second embodiment of the transferable patient care equipment support comprising an equipment supporting portion, first and second posts extending downwardly from the equipment supporting portion, first and second generally spherical portions coupled to the respective first and second posts, and first and second generally cylindrical portions projecting downwardly from the respective first and second spherical portions.

FIG. 15 shows a second embodiment 320 of the equipment support 20 shown in FIG. 1. The equipment support 320 includes an equipment supporting portion 322 configured to support patient care equipment 324 and a coupler 326 coupled to equipment supporting portion 322 and extending downwardly therefrom. The coupler 326 comprises first and second posts 328, 330 extending downwardly from the equipment supporting portion 322, a first generally spherical portion 332 coupled to the first post 328 and a second generally spherical portion 334 coupled to the second post 330. The coupler 326 further comprises first and second generally cylindrical portions 336, 338 that project downwardly from the respective first and second spherical portions 332, 334. Each cylindrical portion 336, 338 has a diameter greater than a diameter of the associated post 328, 330. Each post 328, 330 has first and second portions 340, 342 that respectively extend above and below the associated spherical portion 332, 334. Each post 328, 330 is tapered at a lower end of the second portion 342. A first distance between the first spherical portion 332 and the equipment supporting portion 322 and a second distance between the second spherical portion 334 and the equipment supporting portion 322 are about equal.

Figure 16:
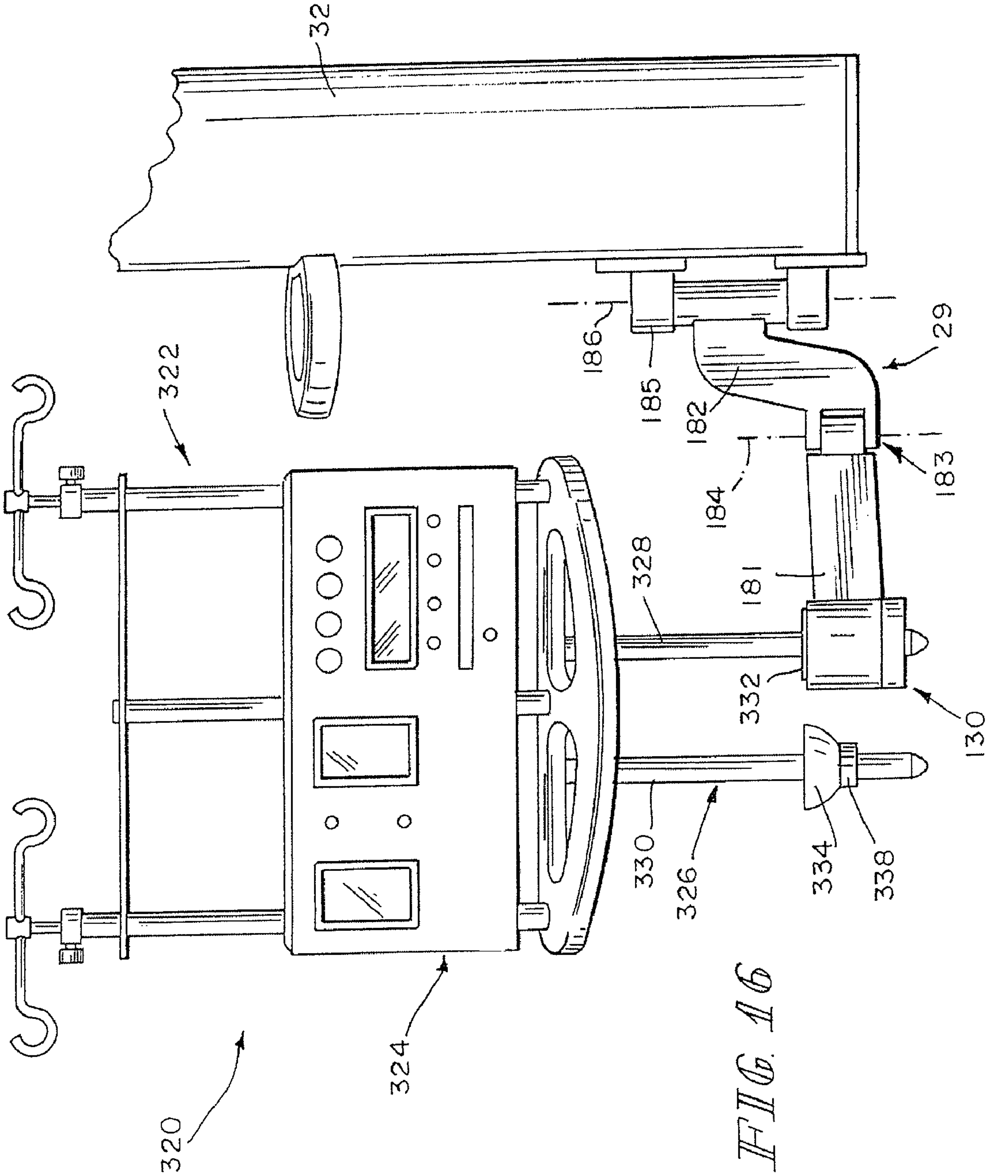
FIG. 16 is a perspective view showing the equipment support of FIG. 15 supported by a generally spherical socket carried by the column.

As shown in FIGS. 16-18, the equipment support 320 is configured to be transferred between a first spherical socket assembly 29 carried by a support structure, such as the service column 32, and a second spherical socket assembly 33 carried by a patient support, such as the hospital bed 36. In the illustrated embodiment, the first spherical socket assembly 29 is substantially similar to the upper spherical socket assembly 30 shown in FIG. 2, except that the upper generally spherical socket 180 having an open configuration (i.e., having a laterally outwardly-opening slot 194) is replaced by the lower generally spherical socket 130 having a closed configuration (i.e., not having a laterally outwardly-opening slot). In the illustrated embodiment, the second spherical socket assembly 33 is substantially similar to the lower spherical socket assembly 34 having the lower generally spherical socket 130.

As shown in FIG. 16, the socket assembly 29 includes the spherical socket 130, the straight arm 181 that extends outwardly from the socket 130, the bent arm 182, the coupler 183 for coupling the straight arm 181 to the bent arm 182 for pivoting movement about the first pivot axis 184, and the bracket 185 for coupling the bent arm 182 to the column 32 for pivoting movement about the second pivot axis 186. As shown in FIG. 17, the socket assembly 33 includes the spherical socket 130, the arm 132 that extends outwardly from the socket 130, and the shaft 134 that extends downwardly from the arm 132. Thus, in the embodiment illustrated in FIGS. 15-18, both socket assemblies 29, 33 use the same spherical socket 130 having a closed configuration.

FIG. 16 shows the equipment support 320 carried by the column 32, with the first spherical portion 332 (FIG. 15) coupled to the first post 328 seated firmly in the upwardly-opening spherical cavity 154 (FIG. 4) in the column-mounted spherical socket 130. FIG. 17 shows the equipment support 320 being transferred from the column-mounted spherical socket 130 to the bed-mounted spherical socket 130. FIG. 18 shows the equipment support 320 carried by the bed 36, with the second spherical portion 334 (FIG. 15) coupled to the second post 330 seated firmly in the upwardly-opening spherical cavity 154 (FIG. 4) in the bed-mounted spherical socket 130.

To transfer equipment support 320 from the column 32 to the bed 36, the column 32 is moved to a position where the second spherical portion 334 carried by the second post 330 is generally aligned over the bed-mounted spherical socket 130 and the intermediate frame 54 is raised. As the intermediate frame 54 moves upwardly, the second spherical portion 334 carried by the second post 330 enters the upwardly-opening spherical cavity 154 in the bed-mounted spherical socket 130 and, when this initially occurs, the first spherical portion 332 carried by the first post 328 is still seated in the upwardly-opening spherical cavity 154 in the column-mounted spherical socket 130 as shown in FIG. 17. Further upward movement of the intermediate frame 54 causes the second spherical portion 334 carried by the second post 330 to seat firmly in the upwardly-opening spherical cavity 154 in the bed-mounted spherical socket 130 and causes the first spherical portion 332 carried by the first post 328 to lift upwardly out of upwardly-opening spherical cavity 154 in the column-mounted spherical socket 130. After the first spherical portion 332 carried by the first post 328 is raised sufficiently relative to column-mounted spherical socket 130, the column 32 can then be pulled away from the bed 36 (or the bed 36 pulled away from the column 32), with the bed 36 carrying the equipment support 320. In such embodiments, where raising of the intermediate frame 54 effects transfer of the equipment support 320 from the column 32 to the bed 36, the column 32 need not have a mechanism for raising and lowering the column-mounted spherical socket 130.

Alternately or additionally, to transfer the equipment support 320 from the column 32 to the bed 36, the column 32 is moved to a position where the second spherical portion 334 carried by the second post 330 is generally aligned over the bed-mounted spherical socket 130 and the column-mounted spherical socket 130 is lowered to a position where the second spherical portion 334 carried by the second post 330 is seated firmly in the upwardly-opening spherical cavity 154 in the bed-mounted spherical socket 130 and the column-mounted spherical socket 130 is positioned below the first spherical portion 332 carried by the first post 328. The column 32 can then be pulled away from the bed 36 (or the bed 36 pulled away from the column 32), with the bed 36 carrying the equipment support 320. In such embodiments, where lowering of the column-mounted spherical socket 130 effects transfer of the equipment support 320 from the column 32 to the bed 36, the bed 36 need not have the elevation adjustment mechanism 60 for raising and lowering the intermediate frame 54 carrying the spherical socket 130. To transfer the equipment support 320 from the bed 36 to the column 32, the sequence of steps is reversed.

Figure 20:
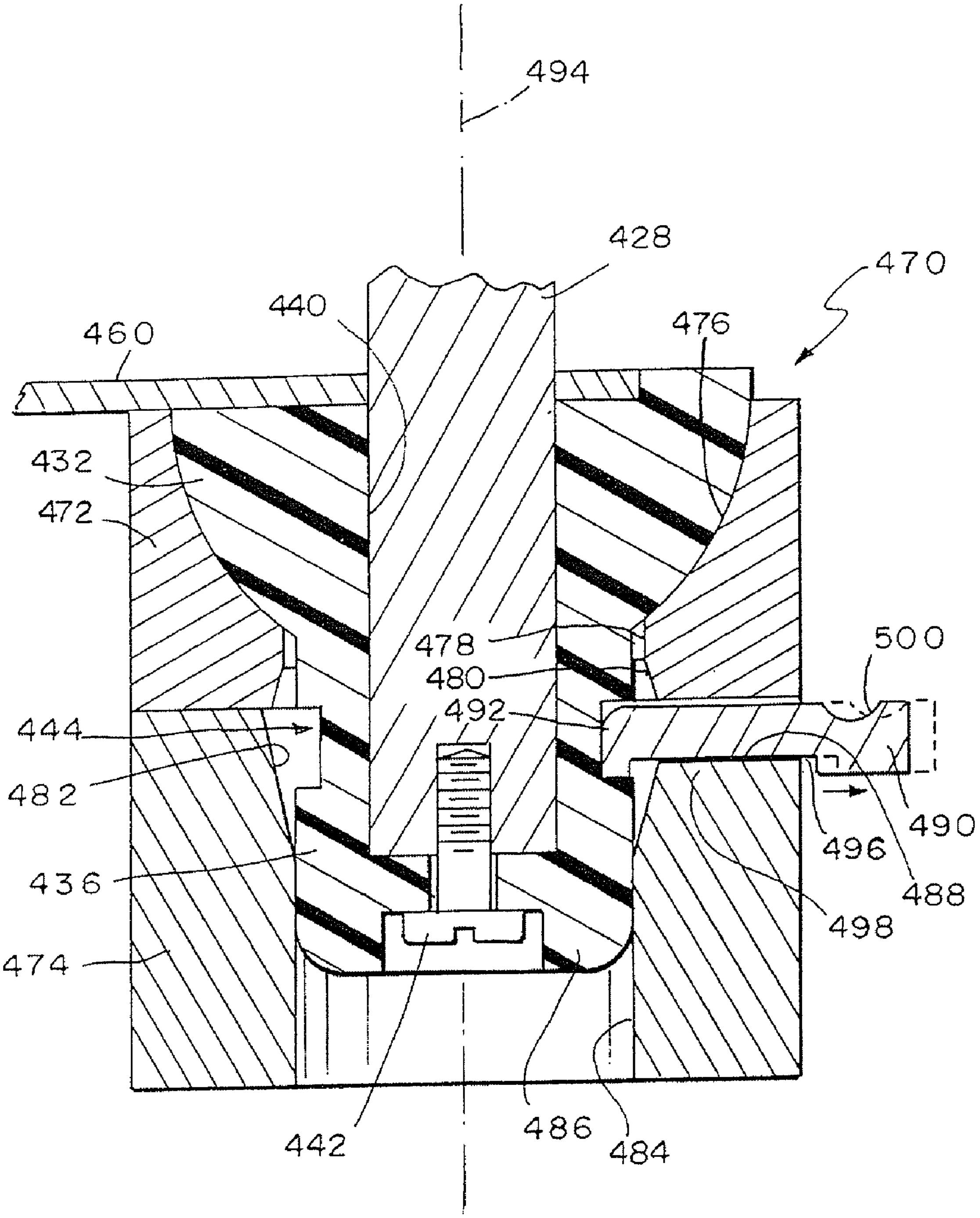
FIG. 20 is a cross sectional view of the column-mounted spherical socket showing the spherical portion of the equipment support seated in an upwardly-opening generally spherical cavity in the socket, the cylindrical portion of the equipment support received in a bore in the socket, and a pull tab received in a groove in the spherical portion of the equipment support.

FIGS. 19-20 show a third embodiment 420 of the transferable patient care equipment support 20 shown in FIG. 1. The equipment support 420 is similar to the equipment support 320, except that the equipment support 420 is lockable to the column 32 or the bed 36. The equipment support 420 includes an equipment supporting portion 422 configured to support patient care equipment 424 and a coupler 426 coupled to equipment supporting portion 422 and extending downwardly therefrom. The coupler 426 comprises first and second posts 428, 430 extending downwardly from the equipment supporting portion 422, a first generally spherical portion 432 coupled to a lower end of the first post 428 and a second generally spherical portion 434 coupled to a lower end of the second post 430. The coupler 426 further comprises first and second generally cylindrical portions 436, 438 that project downwardly from the respective first and second spherical portions 432, 434. Each cylindrical portion 436, 438 has a diameter greater than a diameter of the associated post 428, 430. A first distance between the first spherical portion 432 and the equipment supporting portion 422 and a second distance between the second spherical portion 434 and the equipment supporting portion 422 are about equal. As shown in FIG. 20, the lower ends of the posts 428, 430 are inserted into blind holes 440 in the associated spherical portions 432, 434 and secured thereto by screws 442.

The equipment supporting portion 422, partially shown in FIG. 19, is similar to the equipment supporting portions 22 and 322 shown respectively in FIGS. 1 and 15. The equipment supporting portion 422 includes an upper frame member (not shown), a lower frame member 452, a pair of outer posts 454, 456 near opposite ends of the upper and lower frame members 452 and a central post 458 positioned midway between the outer posts 454. Suitable fasteners, such as pins, studs, threaded screws and the like, may be used for securing the posts 454, 456, 458 to the upper and lower frame members 452. The central post 458 of the equipment supporting portion 422 is coupled to the first and second posts 428, 430 of the coupler 426 by a cross plate 460 to rigidify the structure. In the illustrated embodiment, the cross plate 460 is welded to the posts 428, 430, 458.

As shown in FIG. 19, the equipment support 420 is configured to be transferred between a first spherical socket assembly 31 carried by a support structure, such as the service column 32, and a second spherical socket assembly 35 carried by a patient support, such as the hospital bed 36. In the illustrated embodiment, the first and second spherical socket assemblies 31, 35 are substantially similar to the first and second spherical socket assemblies 29, 33 shown in FIGS. 16-18, except that the socket assemblies 130 shown in FIGS. 16-18 are replaced by socket assemblies 470 shown in FIGS. 19-20. Thus, in the embodiment illustrated in FIGS. 19-20, both socket assemblies 31, 35 use the same spherical socket 470 having a closed configuration.

As shown in FIG. 20, the socket 470 has upper and lower cylindrical portions 472, 474 that are joined together by suitable fasteners, such as pins, screws, studs, and the like. The upper portion 472 has an upwardly-opening generally spherical cavity 476 near its upper end that is configured to receive the associated spherical portion 432, 434 of the coupler 426, a bore 478 that has a diameter slightly greater than the outside diameter of the associated cylindrical portion 436, 438 of the coupler 426, and a bore 480 near its lower end that flares outwardly in a downward direction. The lower portion 474 has an upwardly-opening generally conical cavity 482 near its upper end that is configured to guide the lower rounded end 486 of the associated cylindrical portion 436, 438 into a bore 484 that has a diameter slightly greater than the outside diameter of the associated cylindrical portion 436, 438.

As shown in FIG. 20, the upper and lower portions 472, 474 of the socket 470 define a radially-extending channel 488 in which a locking member or pull tab 490 is mounted for translational movement between a first locking position shown in FIG. 20 where a portion 492 of the pull tab 490 is received in an annular groove 444 in the associated cylindrical portion 436, 438 of the coupler 426 to lock the coupler 426 to the column 32 or the bed 36, as the case may be, and a second unlocking position (shown in phantom in FIG. 20 where the portion 492 of the pull tab 490 is spaced from the associated cylindrical portion 436, 438 of the coupler 426 to unlock the coupler 426 from the column 32 or the bed 36, as the case may be. The channel 488 extends generally perpendicularly to a longitudinal axis 494 of the socket 470. A downwardly-facing surface of the pull tab 490 has a recess 496 in which an upwardly-extending portion 498 of the lower portion 474 of the socket 470 is received. Receipt of the upwardly-extending portion 498 of the lower portion 474 of the socket 470 in the downwardly-facing recess 496 in the pull tab 490 helps to retain the pull tab 490 in place. An upwardly-facing surface of the pull tab 490 defines a finger grip 500. In some embodiments, the pull tab 490 is spring biased toward the locking position to normally lock the coupler 426 to the column 32 or the bed 36, as the case may be. In such embodiments, the caregiver pulls the pull tab 490 outwardly and holds it against the spring force to unlock the coupler 426 from the column 32 or the bed 36 during the transfer of the equipment support 420 between the column 32 and the bed 36.

As shown in FIG. 19, the socket assembly 31 includes the spherical socket 470, the straight arm 181 that extends outwardly from the socket 470, the bent arm 182 (FIGS. 16-17), the coupler 183 (FIGS. 16-17) for coupling the straight arm 181 to the bent arm 182 for pivoting movement about the first pivot axis 184, and the bracket 185 (FIGS. 16-17) for coupling the bent arm 182 to the column 32 for pivoting movement about the second pivot axis 186. The socket assembly 35 includes the spherical socket 470, an arm 502 (similar to the arm 132 shown in FIGS. 17-18) that extends outwardly from the socket 470, and a shaft 504 (similar to the shaft 134 shown in FIGS. 17-18) that extends downwardly from the arm 502. The length of the arm 502 in the embodiment illustrated in FIGS. 19-20 is greater than the length of the arm 132 in the embodiments illustrated in FIGS. 1-12 and FIGS. 15-18. The height of the shaft 504 in the embodiment illustrated in FIGS. 19-20 is greater than the height of the shaft 134 in the embodiments illustrated in FIGS. 1-12 and FIGS. 15-18.

As shown in FIG. 19, the shaft 504 extends through the openings 72, 74 in the respective flanges 68, 70 of the corner bracket 66. A spacer 506 is sleeved over the shaft 504. The spacer 506 extends between a downwardly-facing surface of the arm 502 and an upwardly-facing surface of the upper flange 68. The socket assembly 35 is rotatable about a generally vertical axis 508 between a position (not shown) near a head end 510 of the bed 36 and a position near a left side of the bed 512 as shown in FIG. 19. The head end side rail 514 on the left side 512 of the bed 36 has up and down buttons 516, 518 for raising and lowering the intermediate frame 54.

To transfer equipment support 420 from the column 32 to the bed 36, the pull tab 490 of the column-mounted spherical socket 470 is moved to its unlocking position. The column 32 is then moved to a position where the second spherical portion 434 carried by the second post 430 is generally aligned over the bed-mounted spherical socket 470 as shown in FIG. 19, and the intermediate frame 54 is raised by pressing the bed up button 516. As the intermediate frame 54 moves upwardly, the second spherical portion 434 carried by the second post 430 enters the upwardly-opening spherical cavity 476 in the bed-mounted spherical socket 470 and, when this initially occurs, the first spherical portion 432 carried by the first post 428 is still seated in the upwardly-opening spherical cavity 476 in the column-mounted spherical socket 470. Further upward movement of the intermediate frame 54 causes the second spherical portion 434 carried by the second post 430 to seat firmly in the upwardly-opening spherical cavity 476 in the bed-mounted spherical socket 470 and causes the first spherical portion 432 carried by the first post 428 to lift upwardly out of upwardly-opening spherical cavity 476 in the column-mounted spherical socket 470. After the first spherical portion 432 carried by the first post 428 is raised sufficiently relative to column-mounted spherical socket 470, the column 32 can then be pulled away from the bed 36 (or the bed 36 pulled away from the column 32), with the bed 36 carrying the equipment support 420. In such embodiments, where raising of the intermediate frame 54 effects transfer of the equipment support 420 from the column 32 to the bed 36, the column 32 need not have a mechanism for raising and lowering the column-mounted spherical socket 470.

Alternately or additionally, to transfer the equipment support 420 from the column 32 to the bed 36, the pull tab 490 of the column-mounted socket 470 is moved to its unlocking position. The column 32 is then moved to a position where the second spherical portion 434 carried by the second post 430 is generally aligned over the bed-mounted spherical socket 470, and the column-mounted spherical socket 470 is lowered to a position where the second spherical portion 434 carried by the second post 430 is seated firmly in the upwardly-opening spherical cavity 476 in the bed-mounted spherical socket 470 and the column-mounted spherical socket 470 is positioned below the first spherical portion 432 carried by the first post 428. The column 32 can then be pulled away from the bed 36 (or the bed 36 pulled away from the column 32, with the bed 36 carrying the equipment support 420. In such embodiments, where lowering of the column-mounted spherical socket 470 effects transfer of the equipment support 420 from the column 32 to the bed 36, the bed 36 need not have the elevation adjustment mechanism 60 for raising and lowering the intermediate frame 54 carrying the spherical socket 470. To transfer the equipment support 420 from the bed 36 to the column 32, the sequence of steps is reversed.

An advantage of a two post design of the equipment support, such as the equipment supports 320 and 420 shown in FIGS. 15-18 and FIGS. 19-20, respectively, is that the two post design allows transfer of the equipment support 320 between any "N" devices in any order as long as "N−1" of the "N" devices have a mechanism for raising and lowering the socket carried by that device. Thus, the two post design of the equipment support 420 allows transfer of the equipment support 420 between any three devices, such as the column 32, the bed 36, and the cart 220, in any order as long as two of the three devices, for example, the bed 36 and the cart 220, have mechanisms for raising and lowering the respective sockets.

In the embodiment illustrated in FIGS. 19-20, each of the three devices, the column 32, the bed 36, and the cart 220, have a mechanism for raising and lowering the socket carried by that device. Thus, the column 32 has an actuator (not shown) for raising and lowering the column-mounted socket 470, the bed 36 has the elevation adjustment mechanism 60 for raising and lowering the bed-mounted socket 470, and the cart 220 has the telescoping column 228 for raising and lowering the cart-mounted socket 234. However, since the bed 36 and the cart 220 have mechanisms 60, 228 for raising and lowering the respective sockets 470, 234, the column 32 need not have a mechanism for raising and lowering the column-mounted spherical socket 470.

Figure 21:
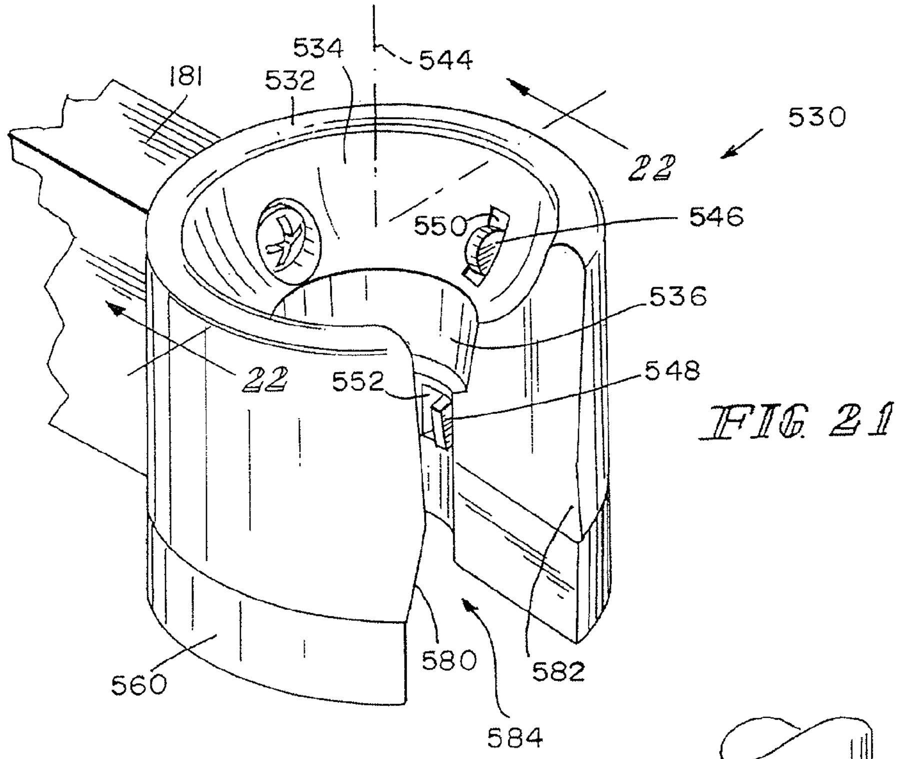
FIG. 21 is a top perspective view of another embodiment of a spherical socket showing a pair of locking members disposed on opposite sides of an upwardly-opening generally spherical cavity in the socket, and further showing the socket having spaced apart end portions defining a laterally outwardly-opening slot in communication with the upwardly-opening spherical cavity.
Figure 22:
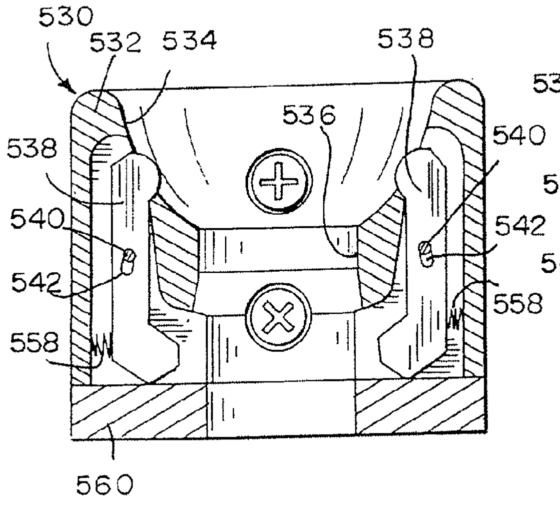
FIG. 22 is a cross sectional view of the socket of FIG. 21 showing the locking members pivotally mounted to the socket such that the upper regions of the locking members extend into the upwardly-opening cavity in the socket.
Figure 23:
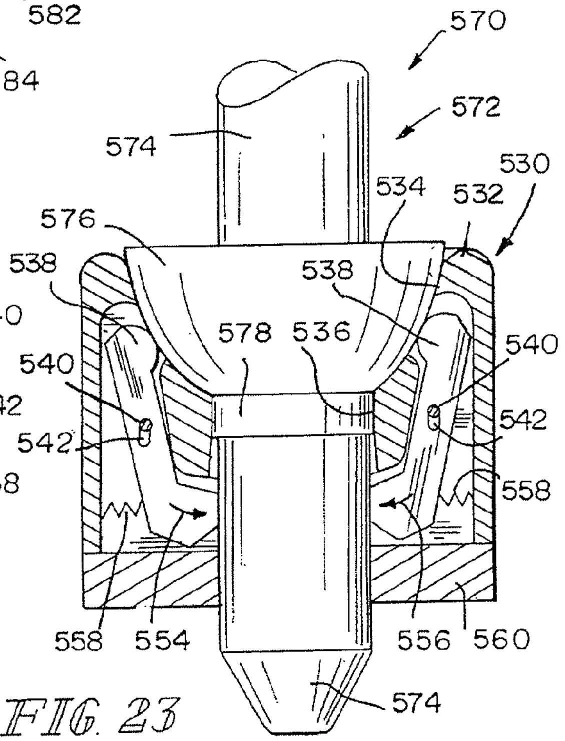
FIG. 23 is a cross sectional view, similar to FIG. 22, showing a spherical portion of an equipment support received in the upwardly-opening spherical cavity in the socket and a cylindrical portion and a post of the equipment support received in a bore in the socket, and further showing the spherical portion contacting the upper regions of the locking members to pivot the locking members so that lower regions of the locking members engage the post.
Figure 24:
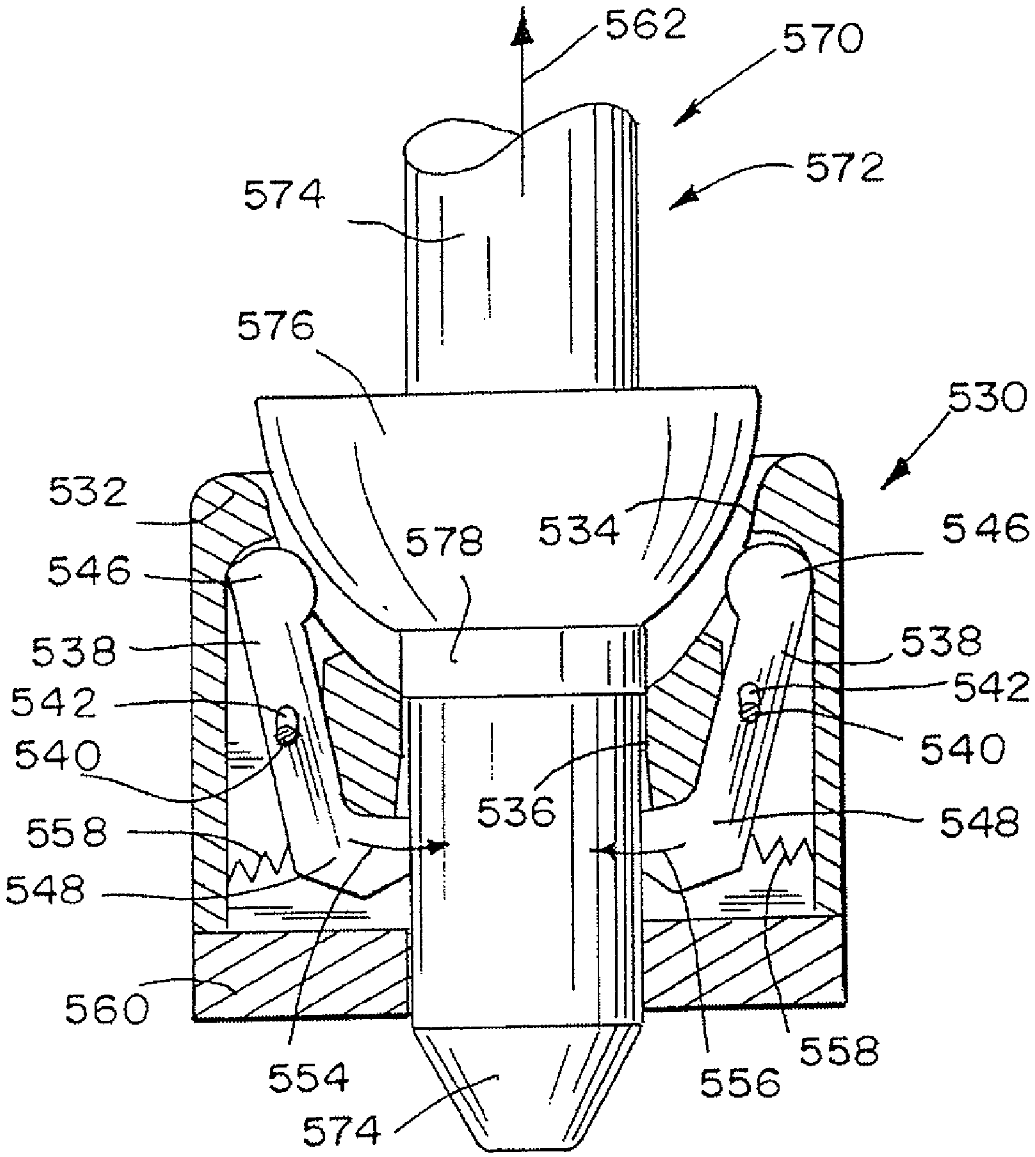
FIG. 24 is a cross sectional view, similar to FIG. 23, showing the lower regions of the locking members digging into the post to lock it in place in response to the post being quickly pulled upwardly out of the socket.

FIGS. 21-24 show a socket 530 suitable for use with an equipment support 570 having a coupler 572 shown in FIGS. 23-24. As shown in FIGS. 23-24, the coupler 572 comprises a post 574, a generally spherical portion 576 coupled to the post 574, and a generally cylindrical portion 578 projecting downwardly from the spherical portion 576 and having a diameter larger than a diameter of the post 574. The socket 530 includes a body 532 having an upwardly-opening cavity 534 that is configured to receive the spherical portion 576 of the coupler 572 and a bore 536 that is configured to receive the cylindrical portion 578 and the post 574. The socket 530 further includes first and second locking members 538 disposed on opposite sides of the cavity 534 and the bore 536. Each locking member 538 is coupled to the body 532 for pivoting movement about a pin 540 which extends through a slot 542 in the locking member 538. The pins 540 extend generally perpendicularly to a longitudinal axis 544 (FIG. 21) of the socket 530.

As shown in FIG. 22, the locking members 538 have upper regions 546 situated in the cavity 534. As shown in FIG. 23, the locking members 538 are configured so that contact of the upper regions 546 of the locking members 538 by the spherical portion 576 of the coupler 572 during downward movement of the coupler 572 into the socket 530 results in pivoting movement of the locking members 538 in respective counterclockwise and clockwise directions 554, 556 so that lower regions 548 of the locking members 538 engage the post 574 of the coupler 572. The body 532 has upper openings 550 (FIG. 21) through which the upper regions 546 of the locking members 538 move into and out of the spherical cavity 534. The body 532 has lower openings 552 (FIG. 21) through which the lower regions 548 of the locking members 538 move into and out of the bore 536. The locking members 538 are coupled to the body 532 for pivoting movement such that, when the upper regions 546 of the locking members 538 move into the cavity 534 through the upper openings 550, the lower regions 548 of the locking members 538 move out of the bore 536 through the lower openings 552, and such that, when the lower regions 548 of the locking members 538 move into the bore 536 through the lower openings 552, the upper regions 546 of the locking members 538 move out of the cavity 534 through the upper openings 550.

As shown in FIG. 24, when the coupler 572 experiences a sudden upward force as indicated by a numeral 562, such as when the bed 36 is going over a bump or a threshold during movement of the patient from one location to another, the locking members 538 tend to pivot in the respective counterclockwise and clockwise directions 554, 556 to cause the lower regions 548 of the locking members 538 to wedge against or dig into the post 574 of the coupler 572. When the lower regions 548 of the locking members 538 dig into the post 574 of the coupler 572, upward movement of the coupler 572 causes corresponding upward movement of the locking members 538 until the pivot pins 540 engage the lower edges of the respective slots 542 in the locking members 538 as shown in FIG. 24. The engagement of the pivot pins 540 with the lower edges of the slots 542 blocks further upward movement of the locking members 538, which, in turn, blocks further upward movement of the post 574. While the locking members 538 block sudden upward movement of the coupler 572, the locking members 538 allow slow upward movement of the coupler 572, such as, for example, when the equipment support 570 is transferred between the column 32 and the bed 36.

In some embodiments, the lower regions 548 of the locking members 538 comprise tacky non-slip surfaces to ensure that the lower regions 548 of the locking members 538 wedge against the post 574 of the coupler 572 when the coupler 572 is suddenly pulled up. In some other embodiments, the lower regions 548 of the locking members 538 comprise rubberized non-slip surfaces. In still other embodiments, the lower regions 548 of the locking members 538 and the corresponding portions of the post 574 of the coupler 572 comprise textured non-slip surfaces. As shown in FIGS. 22-24, in some embodiments, the locking members 538 may be biased in directions 554, 556, such as, for example, by weak springs 558, to ensure that the lower regions 548 of the locking members 538 wedge against the post 574 of the coupler 572 when the coupler 572 is suddenly pulled up. However, these springs are not strong enough to prevent slow removal of the coupler 572, such as, for example, when the equipment support 570 is transferred between the column 32 and the lock 36.

As shown in FIG. 21, the socket 530, like the socket 180 shown in FIGS. 9-11, has a generally c-shaped cross section with spaced apart end portions 580, 582 that define a laterally outwardly-opening slot 584 in communication with the upwardly-opening cavity 534 in the socket 530. The post 574 of the coupler 572 is inserted into the socket 530 through the slot 584 during transfer of the equipment support 570 between a support structure, such as the column 32, and a patient support, such as the bed 36. While, the socket 530 has an open configuration like the socket 180 shown in FIGS.

9-11, it may very well have a closed configuration like the sockets 130, 470, shown in FIGS. 9-11 and FIGS. 19-20. In the illustrated embodiment. a lower end of the socket 530 is closed off by a cap 560.

In the illustrative embodiments, the generally spherical portions 102, 104, 332, 334, 432, 434, 576 are each generally hemispherical as are the surfaces of the sockets that support these elements.

Although the invention has been described in detail with reference to certain illustrative embodiments, variations and modifications exist with the scope and spirit of this disclosure as described and defined in the following claims.

The invention claimed is:

1. A patient care equipment support transferable between a first device having a first generally hemispherical socket and a second device having a second generally hemispherical socket, the equipment support comprising:

an equipment supporting portion configured to support patient care equipment, and a coupler extending downwardly from the equipment supporting portion, the coupler having first and second generally hemispherical portions of substantially equivalent size and shape, the first generally hemispherical portion being configured for receipt in the first generally hemispherical socket to seat upon the first generally hemispherical socket in weight bearing relation and the second generally hemispherical portion being configured for receipt in the second generally hemispherical socket to seat upon the second generally hemispherical socket in weight bearing relation, wherein the first and second generally hemispherical portions are configured to rotate within the respective first and second generally hemispherical sockets about a multitude of axes to compensate for misalignment between the coupler and at least one of the first and second generally hemispherical sockets during transfer of the equipment support between the first and second devices, wherein the coupler comprises parallel spaced apart first and second posts extending downwardly from the equipment supporting portion, the first generally hemispherical portion is coupled to the first post and the second generally hemispherical portion is coupled to the second post with the first and second generally hemispherical portions being spaced from the equipment supporting portion by substantially equivalent distances along the respective first and second posts, wherein each of the first and second generally hemispherical portions terminates at a respective flat, exposed upper surface that is perpendicular to the respective first and second posts, that extends radially outwardly from the respective first and second posts, and that overlies a remaining portion of the respective first and second generally hemispherical portions when the first and second posts are oriented vertically, and wherein the first and second sockets are configured to permit rotation of the first and second generally hemispherical portions within the respective first and second generally hemispherical sockets about a multitude of axes to compensate for misalignment between the coupler and at least one of the first and second generally hemispherical sockets.

2. The equipment support of claim 1, wherein the first and second posts extending downwardly from the equipment supporting portion are cylindrical.

3. The equipment support of claim 2, wherein the coupler comprises a first generally cylindrical portion that projects downwardly from the first generally hemispherical portion and that has a diameter greater than a diameter of the first post.

4. The equipment support of claim 3, wherein the coupler comprises a second generally cylindrical portion that projects downwardly from the second generally hemispherical portion and that has a diameter greater than a diameter of the second post.

5. The equipment support of claim 2, wherein each of the first and second posts have first and second portions that respectively extend above and below the associated generally hemispherical portion.

6. The equipment support of claim 2, wherein each of the first and second posts is tapered at a lower end of the second portion.

7. The equipment support of claim 6, wherein a first distance between the first generally hemispherical portion and the lower end of the first post and a second distance between the second generally hemispherical portion and the lower end of the second post are about equal.

8. The equipment support of claim 1, wherein the equipment support comprises one of an IV pole and a rack adapted to carry infusion equipment.

9. A patient care equipment support transferable between a first device having a first generally hemispherical socket and a second device having a second generally hemispherical socket, the equipment support comprising:

an equipment supporting portion configured to support patient care equipment, and a coupler extending downwardly from the equipment supporting portion, the coupler having first and second generally hemispherical portions of substantially equivalent size and shape, the first generally hemispherical portion being configured for receipt in the first generally hemispherical socket to seat upon the first generally hemispherical socket in weight bearing relation and the second generally hemispherical portion being configured for receipt in the second generally hemispherical socket to seat upon the second generally hemispherical socket in weight bearing relation, wherein the coupler comprises parallel spaced apart first and second posts extending downwardly from the equipment supporting portion, the first generally hemispherical portion is coupled to the first post and the second generally hemispherical portion is coupled to the second post with the first and second generally hemispherical portions being spaced from the equipment supporting portion by substantially equivalent distances along the respective first and second posts, wherein each of the first and second generally hemispherical portions terminates at a respective flat, exposed upper surface that is perpendicular to the respective first and second posts, that extends radially outwardly from the respective first and second posts, and that overlies a remaining portion of the respective first and second generally hemispherical portions when the first and second posts are oriented vertically, and wherein the first and second sockets are configured to permit rotation of the first and second generally hemispherical portions within the respective first and second generally hemispherical sockets about a multitude of axes to compensate for misalignment between the coupler and at least one of the first and second generally hemispherical sockets.

* * * * *